(12) United States Patent
Sekiguchi et al.

(10) Patent No.: US 11,854,585 B2
(45) Date of Patent: Dec. 26, 2023

(54) MAGNETIC RECORDING MEDIUM AND CARTRIDGE

(71) Applicant: Sony Group Corporation, Tokyo (JP)

(72) Inventors: Noboru Sekiguchi, Tokyo (JP); Yuuko Kamoshita, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 59 days.

(21) Appl. No.: 17/790,298

(22) PCT Filed: Jan. 19, 2021

(86) PCT No.: PCT/JP2021/001664
§ 371 (c)(1),
(2) Date: Jun. 30, 2022

(87) PCT Pub. No.: WO2021/149680
PCT Pub. Date: Jul. 29, 2021

(65) Prior Publication Data
US 2023/0042175 A1 Feb. 9, 2023

(30) Foreign Application Priority Data
Jan. 21, 2020 (JP) ................ 2020-007936

(51) Int. Cl.
*G11B 5/71* (2006.01)
*G11B 5/592* (2006.01)
*G11B 5/78* (2006.01)
*G11B 5/706* (2006.01)

(52) U.S. Cl.
CPC .............. *G11B 5/71* (2013.01); *G11B 5/5928* (2013.01); *G11B 5/70678* (2013.01); *G11B 5/78* (2013.01)

(58) Field of Classification Search
None
See application file for complete search history.

(56) References Cited

U.S. PATENT DOCUMENTS 6,139,937 A * 10/2000 Sato .................... G11B 5/84
6,177,175 B1 * 1/2001 Hashimoto ....... G11B 11/10593
428/141

(Continued)

FOREIGN PATENT DOCUMENTS

JP 2005149623 A 6/2005
JP 2005166159 A 6/2005

(Continued)

OTHER PUBLICATIONS

International Search Report from corresponding PCT application PCT/JP2021/00166, dated Apr. 20, 2021.

*Primary Examiner* — Kevin M Bernatz
(74) *Attorney, Agent, or Firm* — K&L Gates LLP

(57) ABSTRACT

A magnetic recording medium is a magnetic recording medium having a tape shape and includes a substrate, an underlayer provided on the substrate, and a magnetic layer provided on the underlayer. The magnetic layer has a surface having an uneven shape, a height range ΔH obtained from statistical information of a height of the uneven shape is in a range of 4.00 nm≤ΔH≤10.00 nm, and a gradient range ΔA obtained from statistical information of a gradient of the uneven shape is in a range of 2.50 degrees ≤ΔA.

20 Claims, 24 Drawing Sheets

(56) References Cited

U.S. PATENT DOCUMENTS

| | | | |
|---|---|---|---|
| 2003/0162056 A1* | 8/2003 | Ono | G11B 5/73927 |
| | | | 428/847.2 |
| 2005/0008822 A1* | 1/2005 | Miyamoto | C03C 19/00 |
| 2005/0106420 A1* | 5/2005 | Kurose | G11B 5/7334 |
| 2015/0194174 A1* | 7/2015 | Sekiguchi | G11B 5/73923 |
| | | | 428/831 |
| 2018/0137887 A1* | 5/2018 | Sekiguchi | G11B 5/7369 |
| 2019/0304497 A1 | 10/2019 | Kurokawa et al. | |
| 2022/0284924 A1* | 9/2022 | Terakawa | G11B 15/60 |

FOREIGN PATENT DOCUMENTS

| | | |
|---|---|---|
| JP | 2006065953 A | 3/2006 |
| JP | 2019175537 A | 10/2019 |
| JP | 2019212354 A | 12/2019 |

\* cited by examiner

Fig. 7
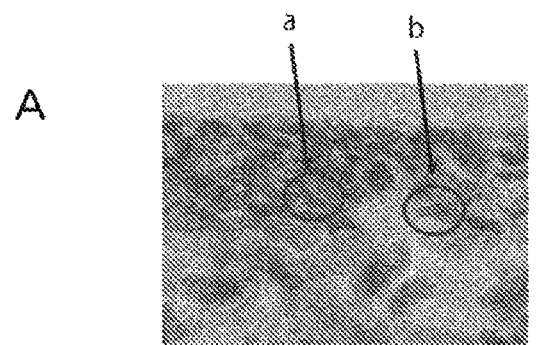
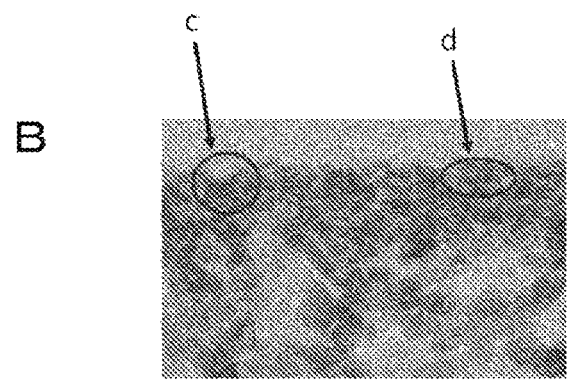

Fig. 9

NUMERICAL DATA MATRIX
OF HEIGHT Z(L,W)

|   | 1 | 2 | 3 | ... | 510 | 511 | 512 | (=L) |
|---|---|---|---|---|---|---|---|---|
| 1 | 0.00 | 0.10 | 0.00 | ... | -0.20 | -0.10 | -0.10 | |
| 2 | 0.10 | 0.20 | 0.00 | ... | 0.20 | 0.20 | 0.10 | |
| 3 | 0.40 | 0.00 | 0.00 | ... | 0.20 | 0.00 | 0.00 | |
| ... | ... | ... | ... | ... | ... | ... | ... | |
| 510 | 0.40 | 0.20 | 0.10 | ... | -0.20 | 0.00 | -0.10 | |
| 511 | 0.10 | -0.20 | -0.10 | ... | -0.30 | -0.10 | 0.00 | |
| 512 | 0.00 | -0.10 | -0.20 | ... | -0.40 | -0.20 | -0.10 | |

NUMERICAL DATA MATRIX
OF HEIGHT $\zeta$ (L,W)

|   | 1 | 2 | 3 | ... | 510 | 511 | 512 ($\approx$L) |
|---|---|---|---|---|---|---|---|
| 1 | 0.10 | 0.20 | 0.10 | ... | -0.10 | 0.00 | 0.00 |
| 2 | 0.20 | 0.30 | 0.10 | ... | 0.30 | 0.30 | 0.20 |
| 3 | 0.50 | 0.10 | 0.10 | ... | 0.30 | 0.10 | 0.10 |
| ... | ... | ... | ... | ... | ... | ... | ... |
| 510 | 0.50 | 0.30 | 0.20 | ... | -0.10 | 0.10 | 0.00 |
| 511 | 0.20 | -0.10 | 0.00 | ... | -0.20 | 0.00 | 0.10 |
| 512 | 0.10 | 0.00 | -0.10 | ... | -0.30 | -0.10 | 0.00 |

($\approx$W)

NUMERICAL DATA MATRIX
OF GRADIENT $G_L(L,W)$

| (=W) \ (=L) | 1 | 2 | 3 | ... | 510 | 511 | 512 |
|---|---|---|---|---|---|---|---|
| 1 | 0.07 | 0.07 | 0.03 | ⋮ | 0.07 | 0.00 | NONE |
| 2 | 0.07 | 0.15 | 0.10 | ⋮ | 0.00 | 0.07 | NONE |
| 3 | 0.29 | 0.00 | 0.12 | ⋮ | 0.15 | 0.00 | NONE |
| ⋮ | ⋮ | ⋮ | ⋮ | ⋮ | ⋮ | ⋮ | ⋮ |
| 510 | 0.15 | 0.07 | 0.05 | ⋮ | 0.15 | 0.07 | NONE |
| 511 | 0.22 | 0.07 | 0.18 | ⋮ | 0.15 | 0.07 | NONE |
| 512 | 0.07 | 0.07 | 0.00 | ⋮ | 0.15 | 0.07 | NONE |

B

NUMERICAL DATA MATRIX
OF GRADIENT $G_W(L,W)$

| (=W) \ (=L) | 1 | 2 | 3 | ... | 510 | 511 | 512 |
|---|---|---|---|---|---|---|---|
| 1 | 0.07 | 0.07 | 0.00 | ⋮ | 0.29 | 0.22 | 0.15 |
| 2 | 0.22 | 0.15 | 0.00 | ⋮ | 0.00 | 0.15 | 0.07 |
| 3 | 0.20 | 0.20 | 0.23 | ⋮ | 0.24 | 0.12 | 0.22 |
| ⋮ | ⋮ | ⋮ | ⋮ | ⋮ | ⋮ | ⋮ | ⋮ |
| 510 | 0.22 | 0.29 | 0.15 | ⋮ | 0.07 | 0.07 | 0.07 |
| 511 | 0.07 | 0.07 | 0.07 | ⋮ | 0.07 | 0.07 | 0.07 |
| 512 | NONE | NONE | NONE | ⋮ | NONE | NONE | NONE |

Fig. 12
A
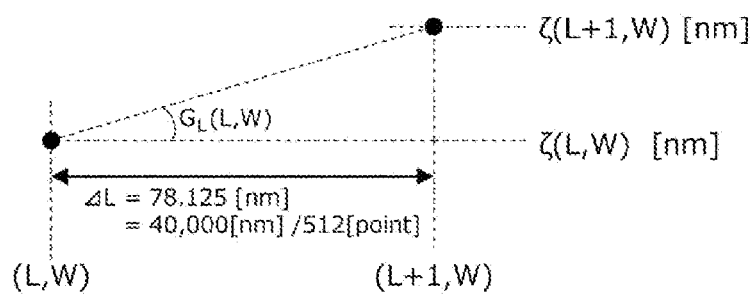
B
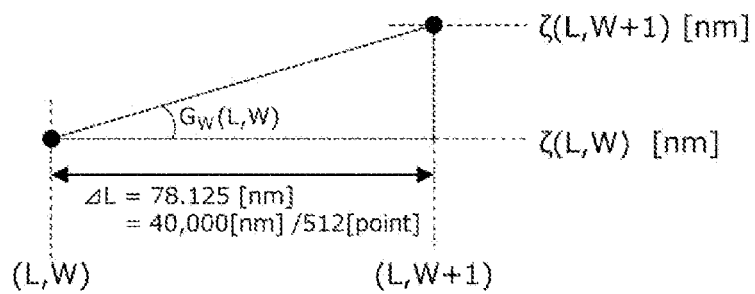

NUMERICAL DATA MATRIX OF HEIGHT Z(L,W)

| (=w) | 1 | 2 | 3 | ... | 510 | 511 | 512 (=L) |
|---|---|---|---|---|---|---|---|
| 1 | 0.0 | 0.1 | 0.0 | ... | -0.2 | -0.1 | -0.1 |
| 2 | 0.1 | 0.2 | 0.0 | ... | 0.2 | 0.2 | 0.1 |
| 3 | 0.4 | 0.0 | 0.0 | ... | 0.2 | 0.0 | 0.0 |
| ... | ... | ... | ... | ... | ... | ... | ... |
| 510 | 0.4 | 0.2 | 0.1 | ... | -0.2 | 0.0 | -0.1 |
| 511 | 0.1 | -0.2 | -0.1 | ... | -0.3 | 0.1 | 0.0 |
| 512 | 0.0 | -0.1 | -0.2 | ... | -0.4 | -0.2 | -0.1 |

NUMERICAL DATA MATRIX OF GRADIENT $G_w$(L,W)

| (=w) | 1 | 2 | 3 | ... | 510 | 511 | 512 (=L) |
|---|---|---|---|---|---|---|---|
| 1 | 0.07 | 0.07 | 0.00 | ... | 0.29 | 0.22 | 0.15 |
| 2 | 0.22 | 0.15 | 0.00 | ... | 0.00 | 0.15 | 0.07 |
| 3 | 0.20 | 0.28 | 0.23 | ... | 0.24 | 0.12 | 0.22 |
| ... | ... | ... | ... | ... | ... | ... | ... |
| 510 | 0.22 | 0.29 | 0.15 | ... | 0.07 | 0.07 | 0.07 |
| 511 | 0.07 | 0.07 | 0.07 | ... | 0.07 | 0.07 | 0.07 |
| 512 | NONE | NONE | NONE | ... | NONE | NONE | NONE |

TABLE OF Z(L,W) VS. $G_w$(L,W)

| | L | W | Z | $G_w$ |
|---|---|---|---|---|
| 1 | 1 | 1 | 0.0 | 0.07 |
| 2 | 2 | 1 | 0.1 | 0.07 |
| 3 | 3 | 1 | 0.0 | 0.00 |
| ... | ... | ... | ... | ... |
| 261630 | 510 | 511 | -0.3 | 0.07 |
| 261631 | 511 | 511 | -0.1 | 0.07 |
| 261632 | 512 | 511 | 0.0 | 0.07 |

NUMERICAL DATA MATRIX OF
NUMBER OF PIECES OF DATA M(H, A)

| | | 0.00 | 0.08 | 0.16 | ... | 1.20 GRADIENT REPRESENTATIVE VALUE A |
|---|---|---|---|---|---|---|
| 2.4 | +11.5 | 0 | 2 | 2 | ... | 2 |
| 4.2 | +11.0 | 3 | 3 | 7 | ... | 4 |
| ... | ... | ... | ... | ... | ... | ... |
| 1844.9 | +1.0 | 2862 | 2758 | 2690 | ... | 674 |
| 1934.1 | +0.5 | 2932 | 3014 | 2977 | ... | 711 |
| 2037.1 | AVERAGING 0 | 3162 | 3123 | 3066 | ... | 711 |

$M_{ave}(H)$  HEIGHT REPRESENTATIVE VALUE H

Fig. 19

|  |  | 916.2 | 902.5 | 889.0 | ... | 3.2 | 2.9 | $M_{ave}(A)$ |
|---|---|---|---|---|---|---|---|---|
|  | AVERAGING | 0.00 | 0.08 | 0.16 | ... | 3.28 | 3.36 | GRADIENT REPRESENTATIVE VALUE A |
| 2.4 | +11.5 | 0 | 2 | 2 | ... | 1 | 4 |  |
| 4.2 | +11.0 | 3 | 3 | 7 | ... | 0 | 2 |  |
| ... | ... | ... | ... | ... | ... | ... | ... |  |
| 1844.9 | +1.0 | 2862 | 2758 | 2690 | ... | 5 | 1 |  |
| 1934.1 | +0.5 | 2932 | 3014 | 2977 | ... | 3 | 2 |  |
| 2037.1 | 0 | 3162 | 3123 | 3066 | ... | 5 | 7 |  |

$M_{ave}(H)$ HEIGHT REPRESENTATIVE VALUE H

Fig. 21
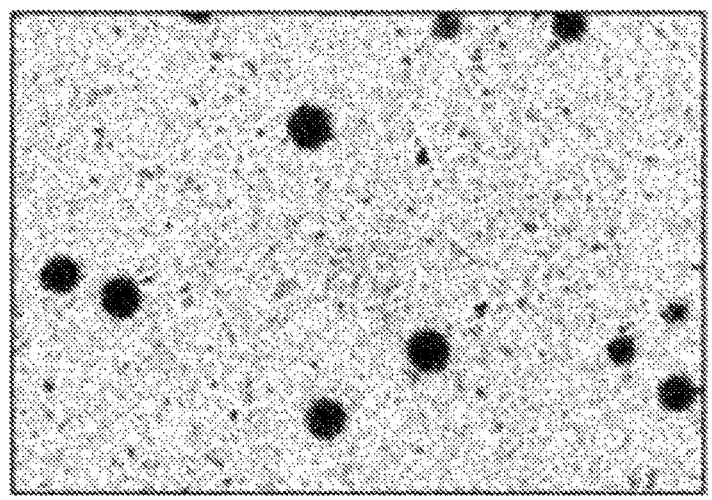
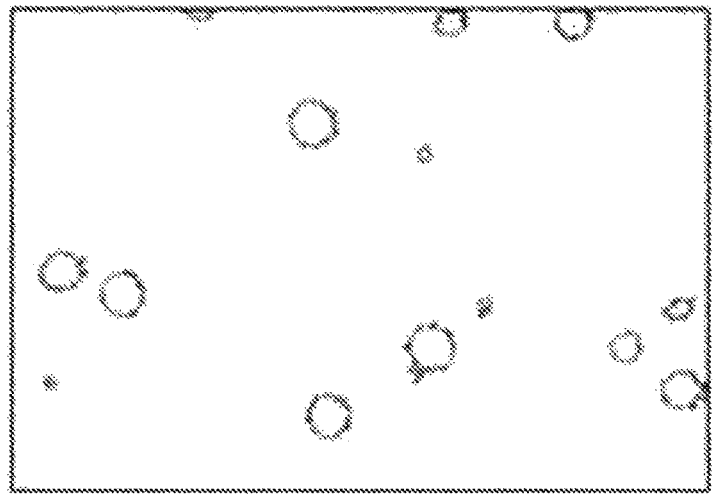

MAGNETIC RECORDING MEDIUM AND CARTRIDGE

TECHNICAL FIELD

The present disclosure relates to a magnetic recording medium and a cartridge.

BACKGROUND ART

Tape-shaped magnetic recording media have been widely used to store electronic data. In a tape-shaped magnetic recording medium, it is desired to reduce the height of irregularities on the surface of a magnetic layer and flatten the surface of the magnetic layer in order to obtain satisfactory recording/reproducing characteristics (electromagnetic conversion characteristics) (see, for example, PTL 1).

CITATION LIST

Patent Literature

[PTL 1]
JP 2006-65953 A

SUMMARY

Technical Problem

However, a reduction in the height of irregularities on the surface of the magnetic layer results in running instability, such as an increase in friction, as an adverse effect.

An object of the present disclosure is to provide a magnetic recording medium capable of achieving both excellent recording/reproducing characteristics and excellent running stability and a cartridge including the magnetic recording medium.

Solution to Problem

In order to solve the problems described above, a first disclosure is a magnetic recording medium with a tape shape including
a substrate,
an underlayer provided on the substrate, and
a magnetic layer provided on the underlayer,
wherein the magnetic layer has a surface having an uneven shape,
a height range $\Delta H$ obtained from statistical information of a height of the uneven shape is in a range of 4.00 nm $\leq \Delta H \leq$ 10.00 nm, and
a gradient range $\Delta A$ obtained from statistical information of a gradient of the uneven shape is in a range of 2.50 degrees $\leq \Delta A$.

A second disclosure is a cartridge including the magnetic recording medium according to the first disclosure.

BRIEF DESCRIPTION OF DRAWINGS

FIGS. 7A and 7B are diagrams illustrating an example of a TEM photograph of a magnetic layer.

FIG. 9 is a diagram illustrating an example of a numerical data matrix of a relative height $Z(L, W)$.

FIG. 10 is a diagram illustrating a method of calculating gradients $G_L(L, W)$ and $G_W(L, W)$ at each point $(L, W)$.

FIG. 11A is a diagram illustrating an example of a numerical data matrix of a gradient $G_L(L, W)$. FIG. 11B is a diagram illustrating an example of a numerical data matrix of a gradient $G_W(L, W)$.

FIG. 12A is a diagram illustrating a method of calculating a gradient $G_L(L, W)$.

FIG. 12B is a diagram illustrating a method of calculating a gradient $G_W(L, W)$.

FIG. 13 is a diagram illustrating statistical processing of data having a relative height $Z(L, W)$ and a gradient $G_L(L, W)$.

FIG. 14 is a diagram illustrating statistical processing of data having a relative height $Z(L, W)$ and a gradient $G_W(L, W)$.

FIG. 15 is a diagram illustrating statistical processing of data having a relative height $Z(L, W)$, a gradient $G_L(L, W)$, and a gradient $G_W(L, W)$.

FIG. 17 is a diagram illustrating a method of calculating a height range $\Delta H$.

FIG. 19 is a diagram illustrating a method of calculating a gradient range $\Delta A$.

FIGS. 21A and 21B are diagrams illustrating a method of measuring the amount of oozing of a lubricant.

DESCRIPTION OF EMBODIMENTS

An embodiment of the present disclosure will be described in the following order.

1 Configuration of cartridge
2 Configuration of cartridge memory
3 Configuration of magnetic tape 4 Method of manufacturing magnetic tape
5 Effects
6 Modification Examples

1 CONFIGURATION OF CARTRIDGE

Figure 1:
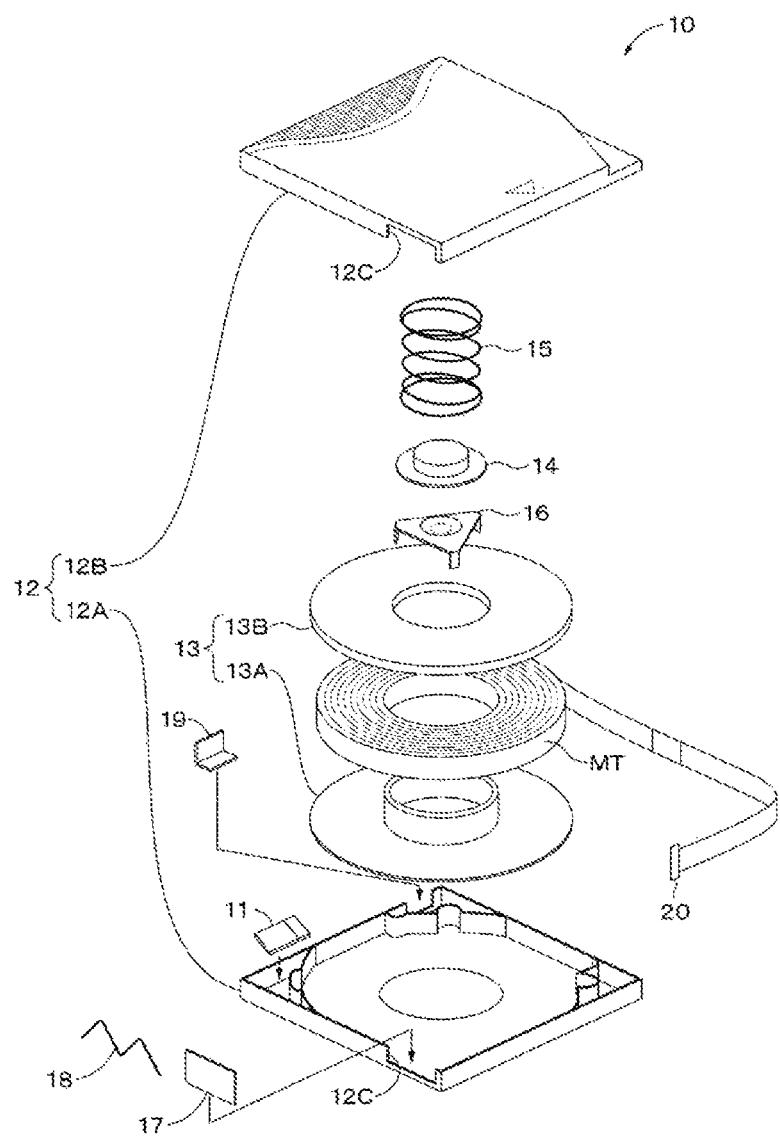
FIG. 1 is an exploded perspective view illustrating an example of a configuration of a cartridge according to an embodiment of the present disclosure.

FIG. 1 is an exploded perspective view illustrating an example of a configuration of a cartridge 10. The cartridge 10 includes a reel 13 on which a tape-shaped magnetic recording medium (hereinafter referred to as a "magnetic tape") MT is wound, a reel lock 14 and a reel spring 15 for locking the rotation of the reel 13, a spider 16 for releasing a locked state of the reel 13, a slide door 17 that opens and closes a tape drawing port 12C provided in a cartridge case 12 across a lower shell 12A and an upper shell 12B, a door spring 18 that biases the slide door 17 against a closed position of the tape drawing port 12C, a write protect 19 for preventing erroneous erasure, and a cartridge memory 11 inside the cartridge case 12 constituted by the lower shell 12A and the upper shell 12B. The reel 13 has a substantially disk shape having an opening in the center part, and is constituted by a reel hub 13A made of a hard material such as a plastic and a flange 13B. A leader pin 20 is provided at one end of the magnetic tape MT.

The cartridge 10 may be a magnetic tape cartridge based on a linear tape-open (LTO) standard or may be a magnetic tape cartridge based on a standard different from the LTO standard.

The cartridge memory 11 is provided in the vicinity of one corner of the cartridge 10. When the cartridge 10 is loaded in a recording/reproducing device, the cartridge memory 11 faces a reader/writer of the recording/reproducing device. The cartridge memory 11 communicates with a recording/reproducing device, specifically, a reader/writer based on a wireless communication standard according to the LTO standard.

2 CONFIGURATION OF CARTRIDGE MEMORY

Figure 2:
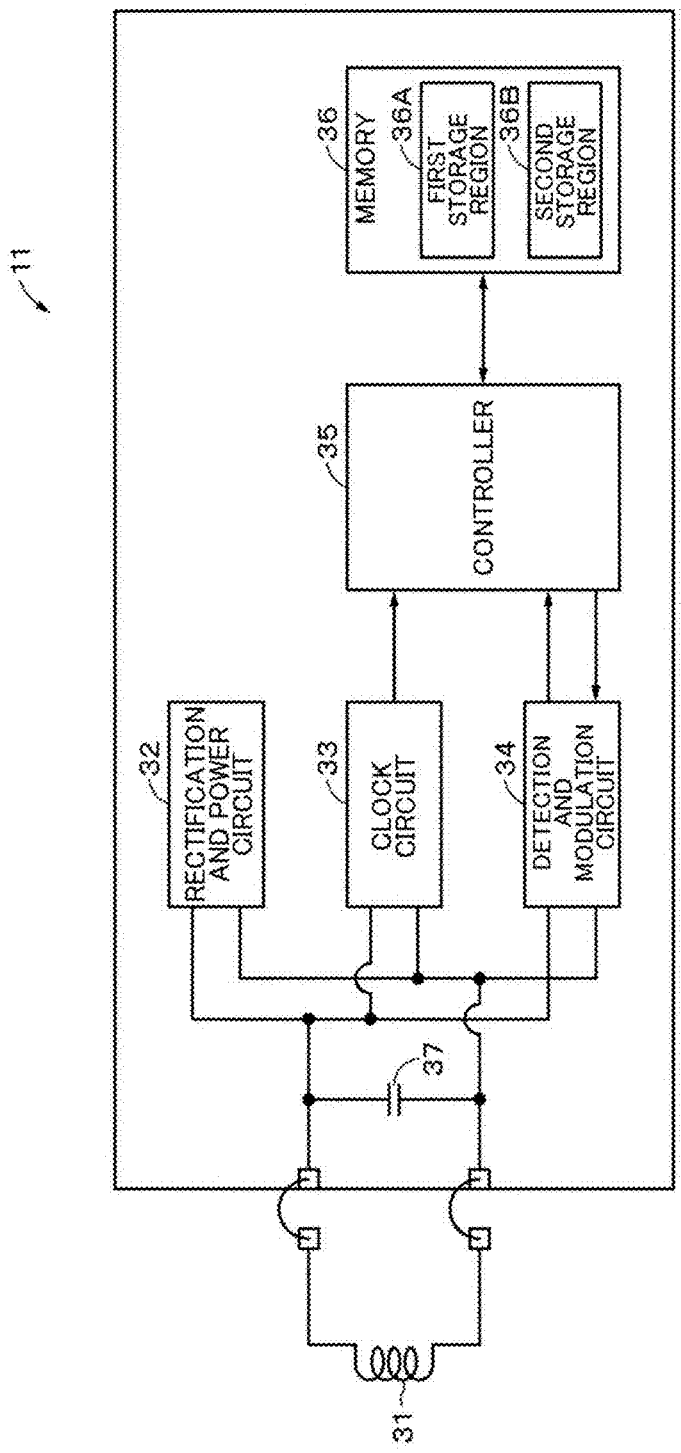
FIG. 2 is a block diagram illustrating an example of a configuration of a cartridge memory.

FIG. 2 is a block diagram illustrating an example of a configuration of the cartridge memory 11. The cartridge memory 11 includes an antenna coil (communication unit) 31 that communicates with a reader/writer according to a specified communication standard, a rectification and power circuit 32 that generates power by generating and rectifying power from radio waves received by the antenna coil 31 using an induced electromotive force, a clock circuit 33 that similarly generates a clock using an induced electromotive force from radio waves received by the antenna coil 31, a detection and modulation circuit 34 that detects radio waves received by the antenna coil 31 and modulates a signal transmitted by the antenna coil 31, a controller (control unit) 35 which is constituted by a logic circuit or the like for discriminating a command and data from a digital signal extracted from the detection and modulation circuit 34 and processing the command and data, and a memory (storage unit) 36 that stores information. In addition, the cartridge memory 11 includes a capacitor 37 which is connected to the antenna coil 31 in parallel, and a resonance circuit is constituted by the antenna coil 31 and the capacitor 37.

The memory 36 stores information and the like related to the cartridge 10. The memory 36 is a non-volatile memory (NVM). A storage capacity of the memory 36 is preferably approximately 32 KB or more.

The memory 36 includes a first storage region 36A and a second storage region 36B. The first storage region 36A is, for example, a region corresponding to a storage region of an LTO standard cartridge memory (hereinafter referred to as a "cartridge memory of the related art") of LTO8 or earlier and storing information based on the LTO standard of LTO8 or earlier. The information based on the LTO standard of LTO8 or earlier is, for example, manufacture information of the cartridge 10 (for example, an inherent number or the like of the cartridge 10), a use history (for example, a thread count or the like), and the like.

The second storage region 36B is equivalent to an extended storage region with respect to the storage region of the cartridge memory of the related art. The second storage region 36B is a region for storing additional information. Here, the additional information is, for example, information related to the cartridge 10 which is not specified by an LTO standard of LTO8 or earlier. Examples of the additional information include tension adjustment information, management record data, index information, thumbnail information of a moving image stored in the magnetic tape MT, and the like, but are not limited to these types of data. The tension adjustment information is information for adjusting tension applied in the longitudinal direction of the magnetic tape MT. The tension adjustment information includes a distance between adjacent servo bands (a distance between servo patterns recorded in the adjacent servo bands) during data recording in the magnetic tape MT. The distance between the adjacent servo bands is an example of width-related information related to the width of the magnetic tape MT. In the following description, information stored in the first storage region 36A may be referred to as "first information", and information stored in the second storage region 36B may be referred to as "second information".

The memory 36 may include a plurality of banks. In this case, the first storage region 36A may be constituted by some of the plurality of banks, and the second storage region 36B may be constituted by the remaining banks.

The antenna coil 31 induces an induced voltage by electromagnetic induction. The controller 35 communicates with the recording/reproducing device according to a specified communication standard through the antenna coil 31. Specifically, the controller performs, for example, mutual authentication, transmission and reception of commands, data exchange, and the like.

The controller 35 stores information received from the recording/reproducing device through the antenna coil 31 in the memory 36. For example, tension adjustment information received from the recording/reproducing device through the antenna coil 31 is stored in the second storage region 36B of the memory 36. The controller 35 reads information from the memory 36 in response to a request of the recording/reproducing device and transmits the information to the recording/reproducing device through the antenna coil 31. For example, the controller 35 reads tension adjustment information from the second storage region 36B of the memory 36 in response to a request of the recording/reproducing device and transmits the tension adjustment information to the recording/reproducing device through the antenna coil 31.

3 CONFIGURATION OF MAGNETIC TAPE

Figure 3:
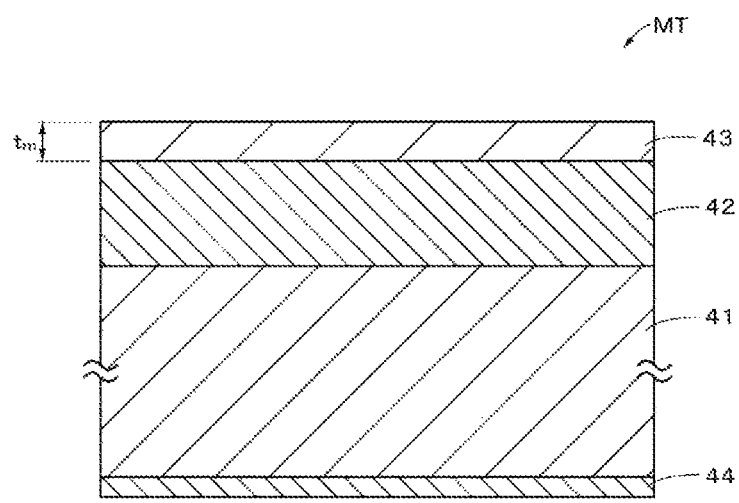
FIG. 3 is a cross-sectional view illustrating an example of a configuration of a magnetic tape.

FIG. 3 is a cross-sectional view illustrating an example of a configuration of the magnetic tape MT. The magnetic tape MT includes a long substrate 41, an underlayer 42 provided on one main surface (first main surface) of the substrate 41, a magnetic layer 43 provided on the underlayer 42, and a back layer 44 provided on the other main surface (second main surface) of the substrate 41. Here, the underlayer 42 and the back layer 44 may be provided as necessary or may not be provided. The magnetic tape MT may be a perpendicular recording type magnetic recording medium, or may be a longitudinal recording type magnetic recording medium.

The magnetic tape MT may be based on an LTO standard or may be based on a standard different from the LTO standard. The width of the magnetic tape MT may be ½ inch or may be larger than ½ inch. In a case where the magnetic tape MT is based on the LTO standard, the width of the magnetic tape MT is ½ inch. The magnetic tape MT may have a configuration in which the width of the magnetic tape MT is kept constant or substantially constant by adjusting tension applied in the longitudinal direction of the magnetic tape MT during running by the recording/reproducing device (drive).

The magnetic tape MT has a long shape and runs in the longitudinal direction at the time of recording/reproducing. Note that the surface of the magnetic layer 43 is a surface on which a magnetic head included in the recording/reproducing device runs. The magnetic tape MT is preferably used in a recording/reproducing device including a ring-type head as a recording head. The magnetic tape MT is preferably used in a recording/reproducing device configured to be able to record data with a data track width of 1500 nm or less or 1000 nm or less.

(Substrate)

The substrate 41 is a non-magnetic support that supports the underlayer 42 and the magnetic layer 43. The substrate 41 has a long film shape. An upper limit value of an average thickness of the substrate 41 is preferably 4.4 µm or less, more preferably 3.8 µm or less, and still more preferably 3.4 µm or less. When the upper limit value of the average thickness of the substrate 41 is 4.4 µm or less, a recording capacity capable of being recorded in one data cartridge can be increased more than in a general magnetic tape. A lower limit value of the average thickness of the substrate 41 is preferably 3 µm or more, and more preferably 3.2 µm or more. When the lower limit value of the average thickness of the substrate 41 is 3 µm or more, it is possible to minimize a decrease in the strength of the substrate 41.

The average thickness of the substrate 41 is obtained as follows. First, a magnetic tape MT is prepared and cut to a length of 250 mm to prepare a sample. Subsequently, the layers (that is, the underlayer 42, the magnetic layer 43 and the back layer 44) of the sample other than the substrate 41 are removed with a solvent such as methyl ethyl ketone (MEK) or diluted hydrochloric acid. Next, the thickness of the sample (the substrate 41) is measured at positions of 5 or more points using a Laser Hologage (LGH-110C) (commercially available from Mitutoyo) as a measurement device, and the average thickness of the substrate 41 is calculated by simply averaging (taking an arithmetic mean of) these measured values. Here, the measurement positions are randomly selected from the sample.

The substrate 41 preferably contains polyester. When the substrate 41 contains polyester, it is possible to reduce the Young's modulus of the substrate 41 in the longitudinal direction. Therefore, when the tension of the magnetic tape MT in the longitudinal direction during running is adjusted by the recording/reproducing device, the width of the magnetic tape MT can be kept constant or substantially constant.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB) and polyethylene bisphenoxycarboxylate. When the substrate 41 contains two or more types of polyesters, these two or more types of polyesters may be mixed, copolymerized, or laminated. At least one of the ends and side chains of the polyester may be modified.

When polyester is incorporated into the substrate 41, this is confirmed, for example, as follows. First, in the same manner as in the method of measuring an average thickness of the substrate 41, the layers of the sample other than the substrate 41 are removed. Next, an infrared absorption spectrometry (IR) spectrum of the sample (the substrate 41) is acquired IR. Incorporation of the polyester into the substrate 41 can be confirmed based on the IR spectrum.

In addition to the polyester, for example, the substrate 41 may further contain at least one of a polyamide, a polyimide and a polyamide-imide, or may further contain at least one of a polyamide, a polyimide, a polyamide-imide, polyolefins, cellulose derivatives, a vinyl resin, and other polymer resins. The polyamide may be an aromatic polyamide (aramid). The polyimide may be an aromatic polyimide. The polyamide-imide may be an aromatic polyamide-imide.

When the substrate 41 contains a polymer resin other than the polyester, the substrate 41 preferably contains polyester as a main component. Here, the main component is a component of which the content (mass proportion) is the largest among the polymer resins contained in the substrate 41. When the substrate 41 contains a polymer resin other than the polyester, the polyester and the polymer resin other than the polyester may be mixed or copolymerized.

The substrate 41 may be biaxially stretched in the longitudinal direction and the width direction. The polymer resin contained in the substrate 41 is preferably oriented obliquely with respect to the width direction of the substrate 41.

(Magnetic Layer)

The magnetic layer 43 is a recording layer in which a signal is recorded by a magnetization pattern. The magnetic layer 43 may be a perpendicular recording type recording layer or a longitudinal recording type recording layer. The magnetic layer 43 contains, for example, a magnetic powder, a binding agent, and a lubricant. The magnetic layer 43 may further contain, as necessary, at least one additive among an antistatic agent, an abrasive, a curing agent, an antirust agent, non-magnetic reinforcing particles, and the like. The magnetic layer 43 has a surface having an uneven shape. A plurality of concave portions (not illustrated) may be provided on the surface of the magnetic layer 43.

Figure 4:
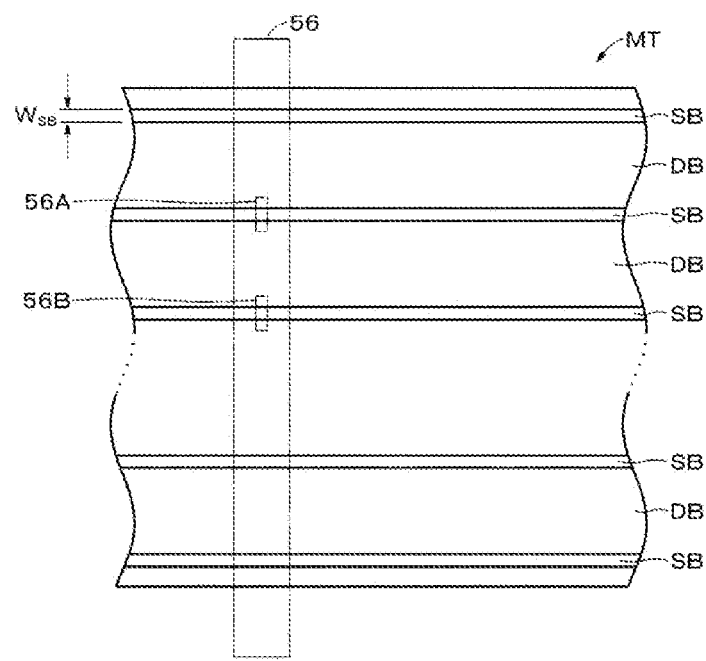
FIG. 4 is a schematic diagram illustrating an example of a layout of data bands and servo bands.

As illustrated in FIG. 4, a plurality of servo bands SB and a plurality of data bands DB may be provided on the magnetic layer 43 in advance. The plurality of servo bands SB are provided at equal intervals in the width direction of the magnetic tape MT. A data band DB is provided between adjacent servo bands SB. The servo bands SB are used to guide a magnetic head (specifically, servo read heads 56A and 56B) at the time of data recording or data reproducing. In each servo band SB, a servo pattern (servo signal) for controlling tracking of the magnetic head is written in advance. User data is recorded in the data band DB.

An upper limit value of a ratio $R_S(=(S_{SB}/S) \times 100)$ of a total area $S_{SB}$ of the plurality of servo bands SB with respect to an area S of the surface of the magnetic layer 43 is preferably 4.0% or less, more preferably 3.0% or less, and still more preferably 2.0% or less from the viewpoint of securing a high recording capacity. On the other hand, a lower limit value of the ratio $R_S$ of the total area $S_{SB}$ of the plurality of servo bands SB with respect to the area S of the surface of the magnetic layer 43 is preferably 0.8% or more from the viewpoint of securing five or more servo bands SB.

The ratio $R_S$ of the total area $S_{SB}$ of the plurality of servo bands SB with respect to the area S of the entire surface of the magnetic layer 43 is obtained as follows. The magnetic tape MT is developed using a ferricolloid developer (commercially available from Sigma Hi-Chemical Inc., Sig-Marker Q), the developed magnetic tape MT is then observed under an optical microscope, and the servo bandwidth $W_{SB}$ and the number of servo bands SB are measured. Next, the ratio $R_S$ is obtained from the following formula.

Ratio $R_S$[%]=(((servo bandwidth $W_{SB}$)×(the number of servo bands SB))/(width of the magnetic tape MT))×100

The number of servo bands SB is, for example, 5+4n (where, n is an integer of 0 or more) or more. The number of servo bands SB is preferably 5 or more, and more preferably 9 or more. When the number of servo bands SB is 5 or more, it is possible to minimize the influence on the servo signal due to the change in the size of the magnetic tape MT in the width direction, and it is possible to secure stable recording/reproducing characteristics with fewer off-track errors. The upper limit value of the number of servo bands SB is not particularly limited, and is, for example, 33 or less.

The number of servo bands SB is obtained in the same manner as in the above method of calculating the ratio $R_S$.

In order to secure a high recording capacity, the upper limit value of the servo bandwidth $W_{SB}$ is preferably 95 μm or less, more preferably 60 μm or less, and still more preferably 30 μm or less. The lower limit value of the servo bandwidth $W_{SB}$ is preferably 10 μm or more. It is difficult to manufacture a magnetic head capable of reading a servo signal of the servo bandwidth $W_{SB}$ of less than 10 μm.

The width of the servo bandwidth $W_{SB}$ is obtained in the same manner as in the above method of calculating the ratio $R_S$.

Figure 5:
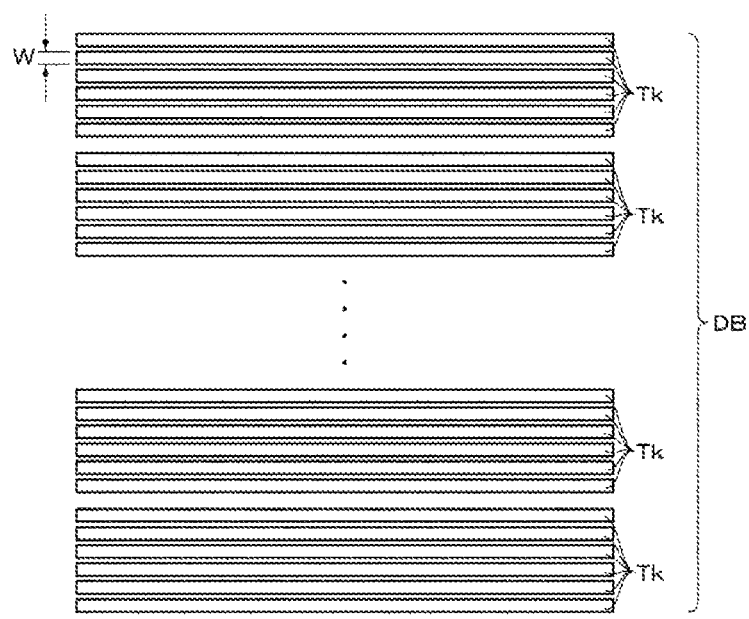
FIG. 5 is an enlarged view illustrating an example of a configuration of a data band.

As illustrated in FIG. 5, the magnetic layer 43 is configured such that a plurality of data tracks Tk can be formed in the data band DB. From the viewpoint of improving a track recording density and securing a high recording capacity, the upper limit value of the data track width W is preferably 2,000 nm or less, more preferably 1,500 nm or less, and still more preferably 1,000 nm or less. The lower limit value of the data track width W is preferably 20 nm or more in consideration of the magnetic particle size.

In order to secure a high recording capacity, the magnetic layer 43 has a configuration in which data can be recorded so that the minimum value L of the distance between magnetization reversals is preferably 48 nm or less, more preferably 44 nm or less, and still more preferably 40 nm or less. The lower limit value of the minimum value L of the distance between magnetization reversals is preferably 20 nm or more in consideration of the magnetic particle size.

The magnetic layer 43 has a configuration in which data can be recorded so that the minimum value L of the distance between magnetization reversals and the data track width W satisfy preferably W/L≤35, more preferably W/L≤30, and still more preferably W/L≤25. When the minimum value L of the distance between magnetization reversals is a certain value, and the minimum value L of the distance between magnetization reversals and the track width W satisfy W/L>35 (that is, when the track width W is large), since the track recording density does not increase, a sufficient recording capacity may not be secured. In addition, when the track width W is a certain value, and the minimum value L of the distance between magnetization reversals and the track width W satisfy W/L>35 (that is, when the minimum value L of the distance between magnetization reversals is small), the bit length becomes smaller, and the line recording density increases, but electromagnetic conversion characteristics may significantly deteriorate due to the influence of the spacing loss. Therefore, in order to secure the recording capacity and minimize deterioration of electromagnetic conversion characteristics, the W/L is preferably in a range of W/L≤35 as described above. The lower limit value of W/L is not particularly limited, and is, for example, 1≤W/L.

The data track width W is obtained as follows. The magnetic tape MT in which data is recorded on the entire surface is prepared, a data recording pattern of the data band DB part of the magnetic layer 43 is observed using a magnetic force microscope (MFM) to obtain an MFM image. As the MFM, Dimension 3100 (commercially available from Digital Instruments) and its analysis software are used. The measurement region of the MFM image is set to 10 μm×10 μm, and the 10 μm×10 μm measurement region is divided into 512×512 (=262,144) measurement points. Three 10 μm×10 μm measurement regions at different locations are measured using the MFM, that is, three MFM images are obtained. From the obtained three MFM images, using analysis software bundled in Dimension 3100, the track width is measured at 10 locations, and an average value (simple average) is obtained. The average value is the data track width W. Here, the measurement conditions of the MFM are as follows: sweep rate: 1 Hz, chip used: MFMR-20, lift height: 20 nm, and correction: Flatten order 3.

The minimum value L of the distance between magnetization reversals is obtained as follows. The magnetic tape MT in which data is recorded on the entire surface is prepared, a data recording pattern of the data band DB part of the magnetic layer 43 is observed using a magnetic force microscope (MFM) to obtain an MFM image. As the MFM, Dimension 3100 (commercially available from Digital Instruments) and its analysis software are used. The measurement region of the MFM image is set to 2 μm×2 μm, and the 2 μm×2 μm measurement region is divided into 512×512 (=262,144) measurement points. Three 2 μm×2 μm measurement regions at different locations are measured using the MFM, that is, three MFM images are obtained. 50 inter-bit distances are measured from the two-dimensional unevenness chart of the recording pattern of the obtained MFM image. The inter-bit distance is measured using analysis software bundled in Dimension 3100. The value that is approximately the greatest common divisor of the measured 50 inter-bit distances is the minimum value L of the distance between magnetization reversals. Here, the measurement conditions are as follows: sweep rate: 1 Hz, chip used: MFMR-20, lift height: 20 nm, and correction: Flatten order 3.

The servo pattern is a magnetized region, which is formed by magnetizing a specific region of the magnetic layer 43 in a specific direction by a servo writer during magnetic tape manufacture. In the servo band SB, a region in which a servo pattern is not formed (hereinafter referred to as a "non-pattern region") may be a magnetized region in which the magnetic layer 43 is magnetized or may be a non-magnetized region in which the magnetic layer 43 is not magnetized.

In a case where the non-pattern region is a magnetized region, the servo-pattern formed region and the non-pattern region may be magnetized in different directions (for example, in directions opposite to each other).

Figure 6:
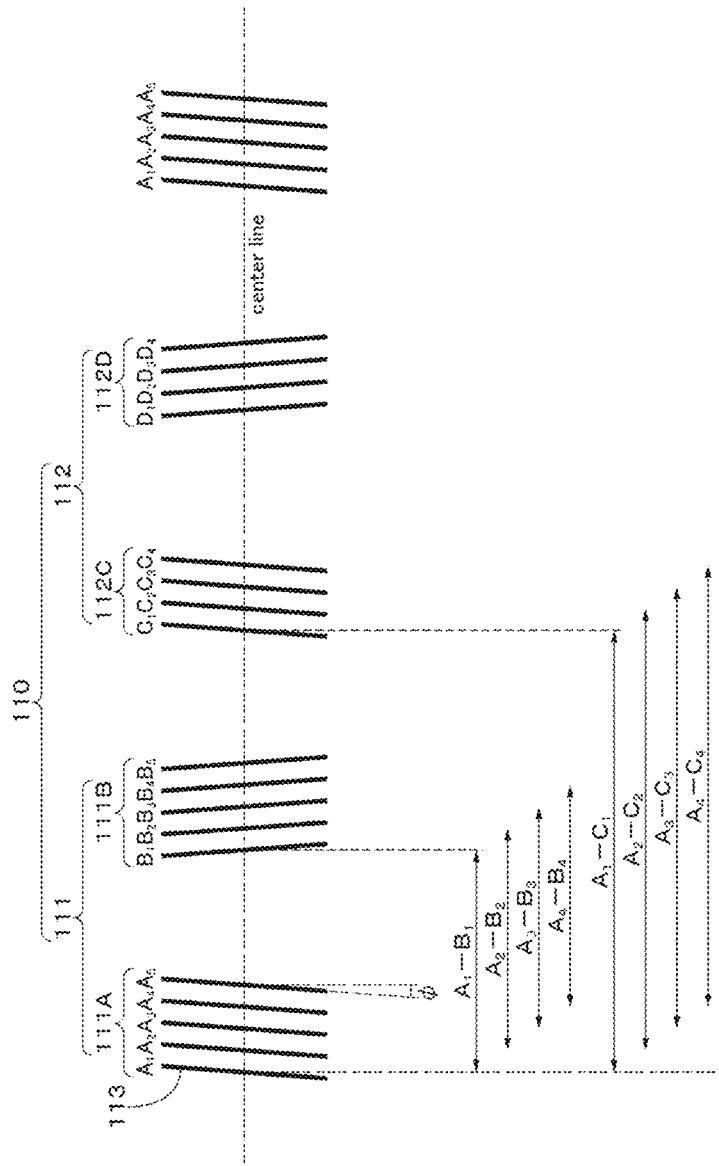
FIG. 6 is an enlarged view illustrating an example of a configuration of a servo band.

In the LTO standard, a servo pattern including a plurality of servo stripes (linear magnetized region) 113 inclined with respect to the width direction of the magnetic tape MT is formed in the servo band SB as illustrated in FIG. 6.

The servo band SB includes a plurality of servo frames 110. Each servo frame 110 includes 18 servo stripes 113. Specifically, each servo frame 110 includes a servo subframe 1 (111) and a servo subframe 2 (112).

The servo subframe 1 (111) is composed of an A burst 111A and a B burst 111B. The B burst 111B is disposed adjacent to the A burst 111A. The A burst 111A includes five servo stripes 113 formed at specified intervals, which are inclined at a predetermined angle φ with respect to the width direction of the magnetic tape MT. In FIG. 6, these five servo stripes 113 are indicated by the reference numerals $A_1$, $A_2$, $A_3$, $A_4$, and $A_5$ from the end of tape (EOT) to the beginning of tape (BOT) of the magnetic tape MT. Similar to the A burst 111A, the B burst 111B includes five servo pulses 63 formed at specified intervals, which are inclined at a predetermined angle φ with respect to the width direction of the magnetic tape MT. In FIG. 6, these five servo stripes 113 are indicated by the reference numerals $B_1$, $B_2$, $B_3$, $B_4$, and $B_5$ from the EOT to the BOT of the magnetic tape MT. The servo stripe 113 of the B burst 111B is inclined in the direction opposite to the servo stripe 113 of the A burst 111A. That is, the servo stripe 113 of the A burst 111A and the servo stripe 113 of the B burst 111B are disposed in an inverted V-shape.

The servo subframe 2 (112) includes a C burst 112C and a D burst 112D. The D burst 112D is disposed adjacent to the C burst 112C. The C burst 112C includes four servo stripes 113 formed at specified intervals, which are inclined at a predetermined angle φ with respect to the width direction of the tape. In FIG. 6, these four servo stripes 113 are indicated by the reference numerals $C_1$, $C_2$, $C_3$, and $C_4$ from EOT to BOT of the magnetic tape MT. Like the C burst 112C, the D burst 112D includes four servo stripes 63 formed at specified intervals, which are inclined at a predetermined angle φ with respect to the width direction of the tape. In FIG. 6, these four servo stripes 113 are indicated by the reference numerals $D_1$, $D_2$, $D_3$, and $D_4$ from EOT to BOT of the magnetic tape MT. The servo stripe 113 of the D burst 112D and the servo stripe 113 of the C burst 112C are inclined in directions opposite to each other. That is, the servo stripe 113 of the C burst 112C and the servo stripe 113 of the D burst 112D are disposed in an inverted V-shape.

The predetermined angle φ of the servo stripe 113 in the A burst 111A, the B burst 111B, the C burst 112C, and the D burst 112D may be, for example, 5° to 25°, and particularly 11° to 25°.

When the servo band SB is read in the magnetic head, information for acquiring the tape speed and the vertical position of the magnetic head can be obtained. The tape speed is calculated from the time between four timing signals (A1-C1, A2-C2, A3-C3, A4-C4). The head position is calculated from the time between the four timing signals and the time between other four timing signals (A1-B1, A2-B2, A3-B3, A4-B4).

As illustrated in FIG. 6, it is preferable that the servo patterns (that is, the plurality of servo stripes 113) be linearly arranged in the longitudinal direction of the magnetic tape MT. That is, it is preferable that the servo band SB have a linear shape in the longitudinal direction of the magnetic tape MT.

The upper limit value of the average thickness $t_m$ of the magnetic layer 43 is 80 nm or less, preferably 70 nm or less, and more preferably 50 nm or less. When the upper limit value of the average thickness $t_m$ of the magnetic layer 43 is 80 nm or less, since the influence of the diamagnetic field can be reduced when a ring-type head is used as a recording head, it is possible to obtain better electromagnetic conversion characteristics.

The lower limit value of the average thickness $t_m$ of the magnetic layer 43 is preferably 35 nm or more. When the lower limit value of the average thickness $t_m$ of the magnetic layer 43 is 35 nm or more, an output can be secured in a case where an MR type head is used as a reproducing head, and thus it is possible to obtain more excellent electromagnetic conversion characteristics.

The average thickness $t_m$ of the magnetic layer 43 is obtained as follows. First, the magnetic tape MT to be measured is processed by an FIB method or the like and sliced. When the FIB method is used, a carbon layer and a tungsten layer are formed as protective films as a pretreatment for observing a TEM image of a cross section to be described below. The carbon layer is formed on the surface of the magnetic layer 43 and the surface of the back layer 44 of the magnetic tape MT by a vapor deposition method, and the tungsten layer is then additionally formed on the surface of the magnetic layer 43 by a vapor deposition method or a sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed under a transmission electron microscope (TEM) according to the following conditions to obtain a TEM image. Here, the magnification and the acceleration voltage may be appropriately adjusted according to the type of the device.

Device: TEM (H9000NAR commercially available from Hitachi, Ltd.)
Acceleration voltage: 300 kV
Magnification: 100,000×

Next, using the obtained TEM image, the thickness of the magnetic layer 43 is measured at positions of at least 10 points or more in the longitudinal direction of the magnetic tape MT. The average value obtained by simply averaging (taking an arithmetic mean of) the obtained measured values is defined as the average thickness $t_m$ [nm] of the magnetic layer 43. Here, the positions at which the measurement is performed are randomly selected from the test piece.

(Magnetic Powder)

The magnetic powder contains a plurality of magnetic particles. The magnetic particles are, for example, particles containing hexagonal ferrite (hereinafter referred to as "hexagonal ferrite particles"), particles containing epsilon-type iron oxide (ε-iron oxide) (hereinafter referred to as "ε-iron oxide particles"), or particles containing Co-containing spinel ferrite (hereinafter referred to as "cobalt ferrite particles"). It is preferable that the magnetic powder be crystal-orientated preferentially in the vertical direction of the magnetic tape MT. In this specification, the vertical direction (thickness direction) of the magnetic tape MT is the thickness direction of the magnetic tape MT in a planar state.

(Hexagonal Ferrite Particles)

The hexagonal ferrite particles have, for example, a plate shape such as a hexagonal plate shape. In this specification, the hexagonal plate shape includes a substantially hexagonal plate shape. The hexagonal ferrite preferably contains at least one of Ba, Sr, Pb and Ca, and more preferably at least one of Ba and Sr. Specifically, the hexagonal ferrite may be, for example, barium ferrite or strontium ferrite. The barium ferrite may further contain at least one of Sr, Pb and Ca in addition to Ba. The strontium ferrite may further contain at least one of Ba, Pb and Ca in addition to Sr.

More specifically, the hexagonal ferrite has an average composition represented by a general formula of $MFe_{12}O_{19}$. Here, M is, for example, at least one metal of Ba, Sr, Pb and Ca, and preferably at least one metal of Ba and Sr. M may be a combination of Ba, and at least one metal selected from the group consisting of Sr, Pb and Ca. In addition, M may be a combination of Sr, and at least one metal selected from the group consisting of Ba, Pb and Ca. In the above general formula, some of Fe may be replaced with other metal elements.

In a case where a magnetic powder contains hexagonal ferrite particle powder, an average particle size of the magnetic powder is preferably 30 nm or less, more preferably 12 nm or more and 25 nm or less, still more preferably 15 nm or more and 22 nm or less, particularly preferably 15 nm or more and 20 nm or less, and most preferably 15 nm or more and 18 nm or less. When the average particle size of the magnetic powder is 30 nm or less, it is possible to obtain more excellent electromagnetic conversion characteristics (for example, SNR) in the magnetic tape MT having a high recording density. On the other hand, when the average particle size of the magnetic powder is 12 nm or more, dispersibility of the magnetic powder is improved, and more excellent electromagnetic conversion characteristics (for example, SNR) can be obtained.

In a case where the magnetic powder contains hexagonal ferrite particle powder, an average aspect ratio of the magnetic powder may be, for example, 1.0 or more and 3.0 or less. When the average aspect ratio of the magnetic powder is in a range between 1.0 or more and 3.0 or less, aggregation of the magnetic powder can be suppressed. In addition, when the magnetic powder is vertically oriented in the formation process of the magnetic layer 43, resistance to be applied to the magnetic powder can be suppressed. Thus, a vertical orientation property of the magnetic powder can be improved. Further, in a case where the magnetic powder contains hexagonal ferrite particle powder, the average aspect ratio of the magnetic powder is preferably 1.0 or more and 2.5 or less, more preferably 1.0 or more and 2.1 or less, and still more preferably 1.0 or more and 1.8 or less. When the average aspect ratio of the magnetic powder is in a range between 1.0 or more and 2.5 or less, aggregation of the magnetic powder can be further suppressed. In addition, when the magnetic powder is vertically oriented in the formation process of the magnetic layer 43, resistance to be applied to the magnetic powder can be further suppressed. Thus, a vertical orientation property of the magnetic powder can be further improved.

In a case where the magnetic powder contains hexagonal ferrite particle powder, the average particle size and the average aspect ratio of the magnetic powder are obtained as follows. First, the magnetic tape MT to be measured is processed by an FIB method or the like and sliced. When the FIB method is used, a carbon layer and a tungsten layer are formed as protective films as a pretreatment for observing a TEM image of a cross section to be described below. The carbon layer is formed on the surface of the magnetic layer 43 and the surface of the back layer 44 of the magnetic tape MT by a vapor deposition method, and the tungsten layer is then additionally formed on the surface of the magnetic layer 43 by a vapor deposition method or a sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000× by using a transmission electron microscope (H-9500 manufactured by Hitachi High Technologies Co., Ltd.), and a TEM photograph is captured. Next, 50 particles of which the sides are oriented toward an observation surface and the particle thickness can be clearly confirmed are selected from the captured TEM photograph. For example, an example of the TEM photograph is illustrated in FIGS. 7A and 7B. In FIGS. 7A and 7B, for example, particles indicated by arrows a and d are selected because the thicknesses thereof can be clearly confirmed. A maximum plate thickness DA of each of the selected 50 particles is measured. An average maximum plate thickness $DA_{ave}$ is obtained by simply averaging (taking an arithmetic mean of) these maximum plate thicknesses DA obtained in this manner. Subsequently, a plate diameter DB of each magnetic powder is measured. In order to measure the plate diameter DB of the particle, 50 particles each of which the plate diameter can be clearly confirmed are selected from the captured TEM photograph. For example, in FIGS. 7A and 7B, for example, particles indicated by arrows b and c are selected because the plate diameters thereof can be clearly confirmed. A plate diameter DB of each of the selected 50 particles is measured. An average plate diameter $DB_{ave}$ is obtained by simply averaging (taking an arithmetic mean of) these plate diameters DB. The average plate diameter $DB_{ave}$ is an average particle size. Then, an average aspect ratio ($DB_{ave}/DA_{ave}$) is obtained from the average maximum plate thickness $DA_{ave}$ and the average plate diameter $DB_{ave}$.

In a case where the magnetic powder contains hexagonal ferrite particle powder, an average particle volume of the magnetic powder is preferably 5900 $nm^3$ or less, more preferably 500 $nm^3$ or more and 3400 $nm^3$ or less, still more preferably 1000 $nm^3$ or more and 2500 $nm^3$ or less, particularly preferably 1000 $nm^3$ or more and 1800 $nm^3$ or less, and most preferably 1000 $nm^3$ or more and 1600 $nm^3$ or less. When the average particle volume of the magnetic powder is 5900 $nm^3$ or less, the same effects as in a case where the average particle size of the magnetic powder is set to 30 nm or less are obtained. On the other hand, when the average particle volume of the magnetic powder is 500 $nm^3$ or more, the same effects as in a case where the average particle size of the magnetic powder is set to 12 nm or more are obtained.

The average particle volume of the magnetic powder is obtained as follows. First, as described with respect to the above-described method of calculating the average particle size of the magnetic powder, an average maximum plate thickness $DA_{ave}$ and an average plate diameter $DB_{ave}$ are obtained. Next, an average volume V of a magnetic powder is obtained by the following formula.

$$V = \frac{3\sqrt{3}}{8} \times DA_{ave} \times DB_{ave} \times DB_{ave} \qquad \text{[Math. 1]}$$

(ε-Iron Oxide Particles)

The ε-iron oxide particles are hard magnetic particles that allow a high coercive force to be obtained even with fine particles. The ε-iron oxide particles have a spherical shape or a cube shape. In this specification, the spherical shape includes a substantially spherical shape. In addition, the cube shape includes a substantially cube shape. Since the ε-iron oxide particles have the above shape, when the ε-iron oxide particles are used as magnetic particles, it is possible to reduce the contact area between particles in the thickness direction of the magnetic tape MT and restrict aggregation of the particles, compared with when barium ferrite particles having a hexagonal plate shape are used as magnetic particles. Therefore, it is possible to improve the dispersibility of the magnetic powder, and obtain better electromagnetic conversion characteristics (for example, SNR).

The ε-iron oxide particles have a core-shell type structure. Specifically, the e-iron oxide particles have a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of ε-$Fe_2O_3$ crystal as a main phase, and more preferably composed of single-phase ε-$Fe_2O_3$.

The first shell part covers at least a part of the periphery of the core part. Specifically, the first shell part may partially cover the periphery of the core part or may cover the entire periphery of the core part. In order to make exchange coupling between the core part and the first shell part sufficient and improve magnetic characteristics, it is preferable to cover the entire surface of the core part.

The first shell part is a so-called soft magnetic layer, and contains, for example, a soft magnetic component such as α-Fe, Ni—Fe alloys or Fe—Si—Al alloys. α-Fe may be obtained by reducing the ε-iron oxide contained in the core part.

The second shell part is an oxide film as an antioxidant layer. The second shell part contains α-iron oxide, aluminum oxide or silicon oxide. The α-iron oxide includes, for example, at least one iron oxide among $Fe_3O_4$, $Fe_2O_3$ and FeO. When the first shell part contains α-Fe (soft magnetic component), the α-iron oxide may be obtained by oxidizing α-Fe contained in the first shell part.

Since the ε-iron oxide particles have the first shell part as described above, a coercive force Hc of the core part alone is kept at a large value in order to secure thermal stability, and the coercive force Hc of the entire ε-iron oxide particles (core-shell particles) can be adjusted to a coercive force Hc suitable for recording. In addition, when the ε-iron oxide particles have the second shell part as described above, in a process of producing the magnetic tape MT and before the process, it is possible to minimize deterioration of the characteristics of the ε-iron oxide particles due to the ε-iron oxide particles being exposed to the air, and rust and the like being generated on the surfaces of the particles. Therefore, it is possible to minimize deterioration of characteristics of the magnetic tape MT.

The ε-iron oxide particles may have a shell part having a single-layer structure. In this case, the shell part has the same configuration as the first shell part. Here, in order to minimize deterioration of characteristics of the ε-iron oxide particles, as described above, it is preferable for the ε-iron oxide particles to have a shell part having a two-layer structure.

The ε-iron oxide particles may contain an additive in place of the core-shell structure, or may contain an additive together with the core-shell structure. In this case, some of Fe of the ε-iron oxide particles is replaced with an additive. Even when the ε-iron oxide particles contain an additive, since the coercive force Hc of the entire ε-iron oxide particles can be adjusted to a coercive force Hc suitable for recording, it is possible to improve ease of recording. The additive is a metal element other than iron, preferably a trivalent metal element, more preferably at least one of Al, Ga and In, and still more preferably at least one of Al and Ga.

Specifically, the ε-iron oxide containing an additive is an ε-$Fe_{2-x}M_xO_3$ crystal (where, M is a metal element other than iron, preferably a trivalent metal element, more preferably at least one of Al, Ga and In, and still more preferably at least one of Al and Ga. x is, for example, 0<x<1).

In a case where the magnetic powder contains ε-iron oxide particle powder, the average particle size of the magnetic powder (average maximum particle size) is, for example, 22.5 nm or less. The average particle size of the magnetic powder (average maximum particle size) is preferably 22 nm or less, more preferably 8 nm or more and 22 nm or less, still more preferably 12 nm or more and 22 nm or less, particularly preferably 12 nm or more and 15 nm or less, and most preferably 12 nm or more and 14 nm or less. In the magnetic tape MT, a region having a size of ½ of the recording wavelength is the actual magnetized region. For this reason, by setting the average particle size of the magnetic powder to half or less of the shortest recording wavelength, more excellent electromagnetic conversion characteristics (for example, SNR) can be obtained. Thus, when the average particle size of the magnetic powder is 22 nm or less, more excellent electromagnetic conversion characteristics (for example, SNR) can be obtained in a magnetic tape MT having a high recording density (for example, a magnetic tape MT) configured to be able to record a signal with a shortest recording wavelength of 44 nm or less. On the other hand, when the average particle size of the magnetic powder is 8 nm or more, dispersibility of the magnetic powder is improved, and more excellent electromagnetic conversion characteristics (for example, SNR) can be obtained.

In a case where the magnetic powder contains ε-iron oxide particle powder, an average aspect ratio of the magnetic powder may be preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic powder is in a range between 1.0 or more and 3.0 or less, aggregation of the magnetic powder can be suppressed. In addition, when the magnetic powder is vertically oriented in the formation process of the magnetic layer 43, resistance to be applied to the magnetic powder can be suppressed. Thus, a vertical orientation property of the magnetic powder can be improved.

In a case where the magnetic powder contains ε-iron oxide particle powder, the average particle size and the average aspect ratio of the magnetic powder are obtained as follows. First, the magnetic tape MT to be measured is processed by a focused ion beam (FIB) method or the like and sliced. When the FIB method is used, a carbon layer and a tungsten layer are formed as protective films as a pretreatment for observing a TEM image of a cross section to be described below. The carbon layer is formed on the surface of the magnetic layer 43 and the surface of the back layer 44 of the magnetic tape MT by a vapor deposition method, and the tungsten layer is then additionally formed on the surface of the magnetic layer 43 by a vapor deposition method or a sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000× by using a transmission electron microscope (H-9500 manufactured by Hitachi High Technologies Co., Ltd.), and a TEM photograph is captured. Next, 50 particles of which the particle shapes can be clearly confirmed are selected from the captured TEM photograph, and a major axis length DL and a minor axis length DS of each particle are measured. Here, the major axis length DL is a maximum distance (so-called maximum ferret diameter) among distances between two parallel lines drawn from all angles so as to be in contact with the contour of each particle. On the other hand, the minor axis length DS is a maximum length among lengths of particles in a direction perpendicular to a major axis (DL) of a particle. Subsequently, an average major axis length $DL_{ave}$ is obtained by simply averaging (taking an arithmetic mean of) these major axis lengths DL of the measured 50 particles. The average major axis length $DL_{ave}$ obtained in this manner is set to be an average particle size of the magnetic powder. In addition, an average minor axis length $DS_{ave}$ is obtained by simply averaging (taking an arithmetic mean of) these minor axis lengths DS of the measured 50 particles. Then, an average aspect ratio ($DL_{ave}/DS_{ave}$) of a particle is obtained from the average major axis length $DL_{ave}$, and the average minor axis length $DS_{ave}$.

In a case where the magnetic powder contains ε-iron oxide particle powder, an average particle volume of the magnetic powder is preferably 5600 nm³ or less, more preferably 250 nm³ or more and 3300 nm³ or less, still more preferably 900 nm³ or more and 2500 nm³ or less, particularly preferably 900 nm³ or more and 1800 nm³ or less, and most preferably 900 nm³ or more and 1600 nm³ or less. In general, the noise of the magnetic tape MT is inversely proportional to the square root of the number of particles (that is, proportional to the square root of the particle volume), and thus more excellent electromagnetic conversion characteristics (for example, SNR) can be obtained by making the particle volume smaller. Thus, when the average particle volume of the magnetic powder is 5600 nm³ or less, more excellent electromagnetic conversion characteristics (for example, SNR) can be obtained similarly to a case where the average particle size of the magnetic powder is set to 22 nm or less. On the other hand, when the average particle volume of the magnetic powder is 250 nm³ or more, the same effects as in a case where the average particle size of the magnetic powder is set to 8 nm or more are obtained.

In a case where the ε-iron oxide particle has a spherical shape, the average particle volume of the magnetic powder is obtained as follows. First, an average major axis length $DL_{ave}$ is obtained in the same manner as in the method of calculating the average particle size of the magnetic powder. Next, an average volume V of the magnetic powder is obtained by the following formula.

$$V=(\pi/6) \times DL_{ave}^3$$

In a case where the ε-iron oxide particle has a cube shape, the average volume of the magnetic powder is obtained as follows. The magnetic tape MT is processed by a focused ion beam (FIB) method or the like and sliced. When the FIB method is used, a carbon film and a tungsten thin film are formed as protective films as a pretreatment for observing a TEM image of a cross section to be described below. The carbon film is formed on the surface of the magnetic layer 43 and the surface of the back layer 44 of the magnetic tape MT by a vapor deposition method, and the tungsten thin film is then additionally formed on the surface of the magnetic layer 43 by a vapor deposition method or a sputtering method. The slicing is performed in the length direction (longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000× by using a transmission electron microscope (H-9500 manufactured by Hitachi High Technologies Co., Ltd.), and a TEM photograph is captured. Here, the magnification and the acceleration voltage may be appropriately adjusted according to the type of the device. Next, 50 particles having a clear particle shape are selected from the captured TEM photograph, and a side length DC of each particle is measured. Subsequently, an average side length $DC_{ave}$ is obtained by simply averaging (taking an arithmetic mean of) these side lengths DC of the measured 50 particles. Next, an average volume $V_{ave}$ of the magnetic powder (particle volume) is obtained from the following formula using the average side length $DC_{ave}$.

$$V_{ave}=DC_{ave}^3.$$

(Cobalt Ferrite Particles)

The cobalt ferrite particles preferably have uniaxial crystal anisotropy. When the cobalt ferrite particles have uniaxial crystal anisotropy, the magnetic powder can be crystal-oriented preferentially in the vertical direction of the magnetic tape MT. The cobalt ferrite particles have, for example, a cube shape. In this specification, the cube shape includes a substantially cube shape. The Co-containing spinel ferrite may further contain at least one of Ni, Mn, Al, Cu and Zn in addition to Co.

The Co-containing spinel ferrite has, for example, an average composition represented by the following formula.

(where, in the formula, M is at least one metal among, for example, Ni, Mn, Al, Cu, and Zn. x is a value in a range of 0.4≤x≤1.0. y is a value in a range of 0≤y≤0.3. Here, x and y satisfy a relationship of (x+y)≤1.0. z is a value in a range of 3≤z≤4. A portion of Fe may be replaced with other metal elements.)

In a case where the magnetic powder contains cobalt ferrite particle powder, the average particle size of the magnetic powder is preferably 25 nm or less, more preferably 8 nm or more and 23 nm or less, still more preferably 8 nm or more and 12 nm or less, and particularly preferably 8 nm or more and 11 nm or less. When the average particle size of the magnetic powder is 25 nm or less, more excellent electromagnetic conversion characteristics (for example, SNR) can be obtained in the magnetic tape MT having a high recording density. On the other hand, when the average particle size of the magnetic powder is 8 nm or more, dispersibility of the magnetic powder is improved, and more excellent electromagnetic conversion characteristics (for example, SNR) can be obtained. A method of calculating the average particle size of the magnetic powder is the same as a method of calculating the average particle size of the magnetic powder in a case where the magnetic powder contains ε-iron oxide particle powder.

In a case where the magnetic powder contains cobalt ferrite particle powder, the average aspect ratio of the magnetic powder is preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic powder is in a range between 1.0 or more and 3.0 or less, aggregation of the magnetic powder can be suppressed In addition, when the magnetic powder is vertically oriented in the formation process of the magnetic layer 43, resistance to be applied to the magnetic powder can be suppressed. Thus, a vertical orientation property of the magnetic powder can be improved. A method of calculating the average aspect ratio of the magnetic powder is the same as a method of calculating the average aspect ratio of the magnetic powder in a case where the magnetic powder contains ε-iron oxide particle powder.

In a case where the magnetic powder contains cobalt ferrite particle powder, the average particle volume of the magnetic powder is preferably 15000 nm$^3$ or less, more preferably 500 nm$^3$ or more and 3500 nm$^3$ or less, still more preferably 500 nm$^3$ or more and 2500 nm$^3$ or less, particularly preferably 500 nm$^3$ or more and 1800 nm$^3$ or less, and most preferably 500 nm$^3$ or more and 1600 nm$^3$ or less. When the average particle volume of the magnetic powder is 15000 nm$^3$ or less, the same effects as in a case where the average particle size of the magnetic powder is set to 25 nm or less are obtained. On the other hand, when the average particle volume of the magnetic powder is 500 nm$^3$ or more, the same effects as in a case where the average particle size of the magnetic powder is set to 8 nm or more are obtained. A method of calculating the average particle volume of the magnetic powder is the same as a method of calculating an average particle volume in a case where a ε-iron oxide particle has a cube shape.

(Binding Agent)

Examples of binding agents include a thermoplastic resin, a thermosetting resin, and a reactive resin. Examples of thermoplastic resins include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene butadiene copolymers, polyurethane resins, polyester resins, amino resins, and synthetic rubber.

Examples of thermosetting resins include phenolic resins, epoxy resins, polyurethane curable resins, urea resins, melamine resins, alkyd resins, silicone resins, polyamine resins, and urea formaldehyde resins.

In all of the above-described binding agent, for the purpose of improving dispersibility of the magnetic powder, —SO$_3$M, —OSO$_3$M, —COOM, P=O(OM)$_2$ (where, M in the formula represents a hydrogen atom or an alkali metal such as lithium, potassium, or sodium), a side-chain amine having a terminal group represented by —NR1R2, —NR1R2R3$^+$X$^-$, a main-chain amine represented by >NR1R2$^+$X$^-$ (where, R1, R2, and R3 in the formula represent a hydrogen atom or a hydrocarbon group, and X$^-$ represents halogen element ions such as fluorine, chlorine, bromine and iodine, inorganic ions, or organic ions), and a polar functional group such as —OH, —SH, —CN, or an epoxy group may be introduced. The amount of these polar functional groups introduced into the binding agent is preferably 10$^{-1}$ to 10$^{-8}$ mol/g and more preferably 10$^{-2}$ to 10$^{-6}$ mol/g.

(Lubricant)

The lubricant contains, for example, at least one selected from among fatty acids and fatty acid esters, and preferably contains both fatty acids and fatty acid esters. When the magnetic layer 43 contains a lubricant, particularly, when the magnetic layer 43 contains both fatty acids and fatty acid esters, this contributes to improving the running stability of the magnetic tape MT. More particularly, when the magnetic layer 43 contains a lubricant and has pores, a good running stability is achieved. It is considered that running stability is improved because a dynamic friction coefficient of the surface of the magnetic tape MT on the magnetic layer 43 side is adjusted to a value suitable for the running of the magnetic tape MT by the lubricant.

The fatty acid is preferably a compound represented by the following General Formula (1) or (2). For example, one or both of the compound represented by the following General Formula (1) and the compound represented by General Formula (2) may be contained as the fatty acid.

In addition, the fatty acid ester is preferably a compound represented by the following General Formula (3) or (4). For example, one or both of the compound represented by the following General Formula (3) and the compound represented by General Formula (4) may be contained as the fatty acid ester.

When the lubricant contains one or both of the compound represented by General Formula (1) and the compound represented by General Formula (2), and one or both of the compound represented by General Formula (3) and the compound represented by General Formula (4), it is possible to minimize an increase in the dynamic friction coefficient due to repeated recording or reproducing of the magnetic tape MT.

$$CH_3(CH_2)_k COOH \quad (1)$$

(where, in General Formula (1), k is an integer selected from the range of 14 or more and 22 or less, and more preferably selected from the range of 14 or more and 18 or less).

$$CH_3(CH_2)_n CH=CH(CH_2)_m COOH \quad (2)$$

(where, in General Formula (2), a sum of n and m is an integer selected from the range of 12 or more and 20 or less, and more preferably selected from the range of 14 or more and 18 or less).

$$CH_3(CH_2)_p COO(CH_2)_q CH_3 \quad (3)$$

(where, in General Formula (3), p is an integer selected from the range of 14 or more and 22 or less, and more preferably selected from the range of 14 or more and 18 or less, and q is an integer selected from the range of 2 or more and 5 or less, and more preferably selected from the range of 2 or more and 4 or less).

$$CH_3(CH_2)_r COO—(CH_2)\cdot CH(CH_3)_2 \quad (4)$$

(where, in General Formula (4), r is an integer selected from the range of 14 or more and 22 or less, and s is an integer selected from the range of 1 or more and 3 or less).

(Antistatic Agent)

Examples of antistatic agents include carbon black, a natural surfactant, a nonionic surfactant, and a cationic surfactant.

(Abrasive)

Examples of abrasives include a-alumina with an a transformation rate of 90% or more, ß-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, and those obtained by performing a surface treatment on the above materials with aluminum and/or silica as necessary.

(Curing Agent)

Examples of curing agents include polyisocyanate. Examples of polyisocyanates include aromatic polyisocyanates such as adducts of tolylene diisocyanate (TDI) and an active hydrogen compound, and aliphatic polyisocyanates such as adducts of hexamethylene diisocyanate (HMDI) and an active hydrogen compound. The weight-average molecular weight of these polyisocyanates is preferably in a range of 100 to 3,000.

(Antirust Agent)

Examples of antirust agents include phenols, naphthols, quinones, heterocyclic compounds containing nitrogen atoms, heterocyclic compounds containing oxygen atoms, and heterocyclic compounds containing sulfur atoms.

(Non-Magnetic Reinforcing Particles)

Examples of non-magnetic reinforcing particles include aluminum oxide (α, ß or γ alumina), chromium oxide, silicon oxide, diamond, garnet, emery, boron nitride, titanium carbide, silicon carbide, titanium carbide, and titanium oxide (rutile type or anatase type titanium oxide).

(Underlayer)

The underlayer 42 is provided to alleviate the unevenness of the surface of the substrate 41 and adjust the unevenness of the surface of the magnetic layer 43. The underlayer 42 is a non-magnetic layer containing a non-magnetic powder, a binding agent and a lubricant. According to the underlayer 42, the lubricant is supplied to the surface of the magnetic layer 43. The underlayer 42 may further contain at least one additive among an antistatic agent, a curing agent, an antirust agent, and the like, as necessary.

An average thickness of the underlayer 42 is preferably 0.3 μm or more and 2.0 μm or less, and more preferably 0.5 μm or more and 1.4 μm or less. Here, the average thickness of the underlayer 42 is obtained in the same manner as in the average thickness $t_m$ of the magnetic layer 43. Here, the magnification of the TEM image is appropriately adjusted according to the thickness of the underlayer 42. When the average thickness of the underlayer 42 is 2.0 μm or less, the degree of expansion and contraction of the magnetic tape MT is larger due to an external force, and thus it is easier to adjust the width of the magnetic tape MT by adjusting the tension.

It is preferable that the underlayer 42 have a plurality of hole portions. When a lubricant is stored in the plurality of hole portions, it is possible to further suppress a decrease in the amount of lubricant supplied between the surface of the magnetic layer 43 and the magnetic head even after recording or reproduction is repeatedly performed (that is, even after the magnetic head is brought into contact with the surface of the magnetic tape MT and runs repeatedly). Thus, it is possible to further suppress an increase in a dynamic friction coefficient. That is, a more excellent running stability can be obtained.

(Non-Magnetic Powder)

The non-magnetic powder contains, for example, at least one of inorganic particle powder and inorganic particle powder. In addition, the non-magnetic powder may contain carbon powder such as carbon black. Here, one type of non-magnetic powder may be used alone, or two or more types of non-magnetic powders may be used in combination. Examples of inorganic particles include metals, metal oxides, metal carbonates, metal sulfates, metal nitrides, metal carbides and metal sulfides. Examples of shapes of non-magnetic powders include various shapes such as a needle shape, a spherical shape, a cube shape, and a plate shape, but the present disclosure is not limited to these shapes.

(Binding Agent and Lubricant)

The binding agent and the lubricant are the same as those of the above magnetic layer 43.

(Additive)

The antistatic agent, the curing agent and the antirust agent are the same as those of the above magnetic layer 43.

(Back Layer)

The back layer 44 contains a binding agent and a non-magnetic powder. The back layer 44 may further contain at least one additive among a lubricant, a curing agent, an antistatic agent, and the like, as necessary. The binding agent and the non-magnetic powder are the same as those of the above underlayer 42.

The average particle size of the non-magnetic powder is preferably 10 nm or more and 150 nm or less, and more preferably 15 nm or more and 110 nm or less. The average particle size of the non-magnetic powder is obtained in the same manner as the above-described average particle size of the magnetic powder. The non-magnetic powder may contain a non-magnetic powder having a particle size distribution of 2 or more.

An upper limit value of an average thickness of the back layer 44 is preferably 0.6 μm or less. When the upper limit value of the average thickness of the back layer 44 is 0.6 μm or less, the thicknesses of the underlayer 42 and the substrate 41 can be kept large even when an average thickness of the magnetic tape MT is 5.6 μm or less, and thus running stability in the recording/reproducing device of the magnetic tape MT can be maintained. A lower limit value of an average thickness of the back layer 44 is not particularly limited, but is, for example, 0.2 μm or more.

The average thickness $t_b$ of the back layer 44 is obtained as follows. First, the average thickness $t_T$ of the magnetic tape MT is measured. The method of measuring the average thickness $t_T$ is as described in the following "Average thickness of magnetic tape". Subsequently, the back layer 44 of the sample is removed with a solvent such as methyl ethyl ketone (MEK) or diluted hydrochloric acid. Next, the thickness of the sample is measured at positions of 5 or more points using the Laser Hologage (LGH-110C) (commercially available from Mitutoyo), and the average value $t_B$ [μm] is calculated by simply averaging (taking an arithmetic mean of) these measured values. Then, the average thickness $t_b$ [μm] of the back layer 44 is obtained from the following formula. Here, the measurement positions are randomly selected from the sample.

$$t_b[\mu m]=t_T[\mu m]-t_B[\mu m]$$

(Average Thickness of Magnetic Tape)

An upper limit value of an average thickness (average total thickness) $t_T$ of the magnetic tape MT is 5.3 μm or less, preferably 5.0 μm or less, more preferably 4.6 μm or less, and still more preferably 4.4 μm or less. When average thickness $t_T$ of the magnetic tape MT is 5.3 μm or less, the recording capacity that can be recorded in one data cartridge can be increased as compared with a general magnetic tape. A lower limit value of an average thickness $t_T$ of the magnetic tape MT is not particularly limited, but is, for example, 3.5 µm or more.

The average thickness $t_T$ of the magnetic tape MT is obtained as follows. First, a magnetic tape MT is prepared and cut to a length of 250 mm to prepare a sample. Next, the thickness of the sample is measured at positions of 5 or more points using the Laser Hologage (LGH-110C) (commercially available from Mitutoyo) as a measurement device, and the average value $t_T$ [µm] is calculated by simply averaging (taking an arithmetic mean of) these measured values. Here, the measurement positions are randomly selected from the sample.

(Coercive Force Hc)

An upper limit value of a coercive force Hc2 of the magnetic layer 43 in the longitudinal direction of the magnetic tape MT is preferably 2,000 Oe or less, more preferably 1,900 Oe or less, and still more preferably 1,800 Oe or less. When the coercive force Hc2 of the magnetic layer 43 in the longitudinal direction of the magnetic tape MT is 2,000 Oe or less, sufficient electromagnetic conversion characteristics can be provided even at a high recording density.

The lower limit value of the coercive force Hc2 of the magnetic layer 43 measured in the longitudinal direction of the magnetic tape MT is preferably 1,000 Oe or more. When the coercive force Hc2 of the magnetic layer 43 measured in the longitudinal direction of the magnetic tape MT is 1,000 Oe or more, demagnetization due to leakage flux from the recording head can be minimized.

The coercive force Hc2 is obtained as follows. First, three sheets of the magnetic tape MT are superimposed on each other with a double-sided tape and are then punched out with a punch of φ6.39 mm to prepare a measurement sample. In this case, marking is performed with an arbitrary non-magnetic ink so that the longitudinal direction (running direction) of the magnetic tape MT can be recognized. Then, an M-H loop of the measurement sample (the entire magnetic tape MT) corresponding to the longitudinal direction (running direction) of the magnetic tape MT is measured using a vibrating sample magnetometer (VSM). Next, coating films (the underlayer 42, the magnetic layer 43, the back layer 44 and the like) are wiped off with acetone, ethanol or the like, and only the substrate 41 remains. Then, three sheets of the obtained substrate 41 are superimposed on each other with a double-sided tape and are then punched out with a punch of φ6.39 mm to prepare a sample for background correction (hereinafter, referred to simply as "correction sample"). Thereafter, an M-H loop of the correction sample (the substrate 41) corresponding to the longitudinal direction of the substrate 41 (the longitudinal direction of the magnetic tape MT) is measured using a VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows: measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction. The coercive force Hc2 is obtained from the obtained M-H loop after background correction. Here, for this calculation, a measurement/analysis program bundled in "Type VSM-P7-15" is used. Note that it is assumed that all of the above-described M-H loop measurements are performed at 25° C. and 50% RH±5% RH. In addition, "diamagnetic field correction" when the M-H loop is measured in the longitudinal direction of the magnetic tape MT is not performed.

(Squareness Ratio)

The squareness ratio S1 of the magnetic layer 43 in the vertical direction of the magnetic tape MT is preferably 65% or more, more preferably 70% or more, still more preferably 75% or more, particularly preferably 80% or more, and most preferably 85% or more. When the squareness ratio S1 is 65% or more, since the vertical orientation of the magnetic powder is sufficiently improved, it is possible to obtain better electromagnetic conversion characteristics.

The squareness ratio S1 in the vertical direction of the magnetic tape MT is obtained as follows. First, three sheets of the magnetic tape MT are superimposed on each other with a double-sided tape and are then punched out with a punch of φ6.39 mm to prepare a measurement sample. In this case, marking is performed with an arbitrary non-magnetic ink so that the longitudinal direction (running direction) of the magnetic tape MT can be recognized. Then, an M-H loop of the measurement sample (the entire magnetic tape MT) corresponding to the vertical direction (thickness direction) of the magnetic tape MT is measured using the VSM. Next, coating films (the underlayer 42, the magnetic layer 43, the back layer 44 and the like) are wiped off with acetone, ethanol or the like, and only the substrate 41 remains. Then, three sheets of the obtained substrate 41 are superimposed on each other with a double-sided tape and are then punched out with a punch of φ6.39 mm to prepare a sample for background correction (hereinafter, referred to simply as "correction sample"). Then, an M-H loop of the sample for correction (the substrate 41) corresponding to the vertical direction (the vertical direction of the magnetic tape MT) of the substrate 41 is measured using the VSM.

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). The measurement conditions are as follows: measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement/analysis program bundled in "Type VSM-P7-15" is used for calculating this background correction.

A saturation magnetization Ms (emu) and a residual magnetization Mr (emu) of the obtained M-H loop after background correction are substituted into the following formula, and the squareness ratio S1(%) is calculated. Note that it is assumed that all of the above-described M-H loop measurements are performed at 25° C. and 50% RH±5% RH. In addition, "diamagnetic field correction" when the M-H loop is measured in the vertical direction of the magnetic tape MT is not measured. Here, for this calculation, a measurement/analysis program bundled in "Type VSM-P7-15" is used.

$$\text{squareness ratio } S1(\%)=(Mr/Ms)\times 100$$

The squareness ratio S2 of the magnetic layer 43 in the longitudinal direction (running direction) of the magnetic tape MT is preferably 35% or less, more preferably 30% or less, still more preferably 25% or less, particularly preferably 20% or less, and most preferably 15% or less. When the squareness ratio S2 is 35% or less, since the vertical orientation of the magnetic powder is sufficiently improved, it is possible to obtain better electromagnetic conversion characteristics.

The squareness ratio S2 in the longitudinal direction of the magnetic tape MT is obtained in the same manner as the squareness ratio S1 except that the M-H loop is measured in the longitudinal direction (running direction) of the magnetic tape MT and the substrate 41.

(Hc2/Hc1) A ratio Hc2/Hc1 between a coercive force Hc1 of the magnetic layer 43 in the vertical direction of the magnetic tape MT and a coercive force Hc2 of the magnetic layer 43 in the longitudinal direction of the magnetic tape MT satisfies relationships of preferably Hc2/Hc1≤0.8, more preferably Hc2/Hc1≤0.75, still more preferably Hc2/Hc1≤0.7, particularly preferably Hc2/Hc1≤0.65, and most preferably Hc2/Hc1≤0.6. When the coercive forces Hc1 and Hc2 satisfy a relationship of Hc2/Hc1≤0.8, the degree of vertical orientation of the magnetic powder can be increased. Therefore, the magnetization transition width can be reduced and a high-output signal can be obtained during signal reproduction, and thus it is possible to obtain better electromagnetic conversion characteristics. Here, as described above, when Hc2 is small, since magnetization reacts with high sensitivity due to a magnetic field in the vertical direction from the recording head, it is possible to form a favorable recording pattern.

In a case where the ratio Hc2/Hc1 is Hc2/Hc1≤0.8, it is particularly effective that the average thickness $t_m$ of the magnetic layer 43 is 90 nm or less. When the average thickness $t_m$ of the magnetic layer 43 exceeds 90 nm, the lower region (a region on the side of the underlayer 42) of the magnetic layer 43 may be magnetized in the longitudinal direction of the magnetic tape MT in a case where a ring-type head is used as the recording head, which results in a concern that the magnetic layer 43 may not be uniformly magnetized in the thickness direction. Thus, even when the ratio Hc2/Hc1 is set to be Hc2/Hc1≤0.8 (that is, even when the degree of vertical orientation of the magnetic powder is increased), there is a concern that more excellent electromagnetic conversion characteristics may not be obtained.

A lower limit value of Hc2/Hc1 is not particularly limited, but is, for example, 0.5≤Hc2/Hc1. Here, the Hc2/Hc1 indicates a degree of vertical orientation of the magnetic powder, and a small Hc2/Hc1 indicates a higher degree of vertical orientation of the magnetic powder.

A method of calculating the coercive force Hc2 of the magnetic layer 43 in the longitudinal direction of the magnetic tape MT is as described above. The coercive force Hc1 of the magnetic layer 43 in the vertical direction of the magnetic tape MT is obtained in the same manner as the coercive force Hc2 of the magnetic layer 43 in the longitudinal direction of the magnetic tape MT except that an M-H loop is measured in the vertical direction (thickness direction) of the magnetic tape MT and the substrate 41.

(Activation Volume $V_{act}$)

An activation volume $V_{act}$ is preferably 8000 nm$^3$ or less, more preferably 6000 nm$^3$ or less, still more preferably 5000 nm$^3$ or less, particularly preferably 4000 nm$^3$ or less, and most preferably 3000 nm$^3$ or less. When the activation volume $V_{act}$ is 8000 nm$^3$ or less, a dispersed state of the magnetic powder is improved, and thus it is possible to make a bit inversion region steep and to suppress deterioration of a magnetization signal recorded on an adjacent track due to a leakage magnetic field from the recording head. Thus, there is a concern that more excellent electromagnetic conversion characteristics may not be obtained.

The above-described activation volume $V_{act}$ is obtained by the following formula derived by Street & Woolley.

$$V_{act}(mm^3)=k_B\times T\times X_{irr}/(\mu_0\times Ms\times S)$$

(where, $k_B$: Boltzmann constant (1.38×10$^{-23}$ J/K), T: temperature (K), $X_{irr}$ irreversible magnetic susceptibility, $\mu_0$: magnetic permeability of vacuum, S: magnetic viscosity coefficient, Ms: saturation magnetization (emu/cm$^3$))

The irreversible magnetic susceptibility $X_{irr}$, the saturation magnetization Ms, and the magnetic viscosity coefficient S substituted in the above-described formula are obtained by using a VSM as follows. Note that a measurement direction of the VSM is set to be the vertical direction (thickness direction) of the magnetic tape MT. In addition, it is assumed that measurement using the VSM is performed at 25° C. and 50% RH f 5% RH on a measurement sample cut out from the magnetic tape MT having a long shape. In addition, it is assumed that "diamagnetic field correction" at the time of measuring the M-H loop in the vertical direction of the magnetic tape MT is not measured.

(Irreversible Magnetic Susceptibility $X_{irr}$)

The irreversible magnetic susceptibility $X_{irr}$ is defined as an inclination near a residual coercive force Hr in an inclination of a residual magnetization curve (DCD curve). First, a magnetic field of −1193 kA/m (15 kOe) is applied to the entire magnetic tape MT and is then returned to zero to set a residual magnetization state. Thereafter, a magnetic field of approximately 15.9 kA/m (200 Oe) is applied in the opposite direction and is then returned to zero to measure a residual magnetization amount. Thereafter, similarly, measurement of applying a magnetic field 15.9 kA/m larger than the applied magnetic field and returning it to zero is repeatedly performed, and a residual magnetization amount is plotted with respect to the applied magnetic field to measure a DCD curve. From the obtained DCD curve, a point where the amount of magnetization is set to zero is defined as a residual coercive force Hr, and the DCD curve is further differentiated to obtain an inclination of the DCD curve in each magnetic field. In the inclination of the DCD curve, an inclination near the residual coercive force Hr is $X_{irr}$.

(Saturation Magnetization Ms)

First, an M-H loop after background correction is obtained in the same manner as the above-described method of measuring the squareness ratio S1. Next, Ms (emu/cm$^3$) is calculated from the value of saturation magnetization Ms (emu) of the obtained M-H loop and the volume (cm$^3$) of the magnetic layer 43 in the measurement sample. Note that the volume of the magnetic layer 43 is obtained by multiplying the area of the measurement sample by an average thickness $t_m$ of the magnetic layer 43. A method of calculating the average thickness $t_m$ of the magnetic layer 43 which is necessary for the calculation of the volume of the magnetic layer 43 is as described above.

(Magnetic Viscosity Coefficient S)

First, a magnetic field of −1193 kA/m (15 kOe) is applied to the entire magnetic tape MT (measurement sample) and is then returned to zero to set a residual magnetization state. Thereafter, a magnetic field having a value equal to the value of the residual coercive force Hr obtained from the DCD curve is applied in the opposite direction. The amount of magnetization is continuously measured at fixed time intervals for 1000 seconds in a state where a magnetic field has been applied. The magnetic viscosity coefficient S is calculated by comparing a relationship between a time t and the amount of magnetization M(t), which is obtained in this manner, with the following formula.

$$M(t)=M0+S\times \ln(t)$$

(where, M(t): amount of magnetization for time t, M0: initial amount of magnetization, S: magnetic viscosity coefficient, ln(t): natural logarithm of time)

(Surface Roughness $R_b$ of Back Surface)

It is preferable that a surface roughness of a back surface (surface roughness of the back layer 44) $R_b$ be $R_b \leq 6.0$ [nm]. When the surface roughness $R_b$ of the back surface is in the above-described range, more excellent electromagnetic conversion characteristics can be obtained.

The surface roughness $R_b$ of the back surface is obtained as follows. First, a magnetic tape MT with a width of 12.65 mm is prepared and cut to a length of 100 mm to prepare a sample. Next, the sample is placed on a slide glass so that a surface to be measured (the surface on the magnetic layer side) faces upward, and an end of the sample is fixed with a mending tape. A surface shape is measured using VertScan (50× objective lens) as a measurement device, and a surface roughness $R_b$ of a back surface is obtained from the following formula based on the ISO 25178 standard.

Device: non-contact roughness meter using optical interference (Non-contact surface/layer cross-sectional shape measurement system VertScan R5500GL-M100-AC manufactured by Ryoka System Co., Ltd.)

Objective lens: 20×

Measurement region: 640×480 pixels (field of view: approximately 237 μm×178 μm field of view)

Measurement mode: phase

Wavelength filter: 520 nm

CCD: ⅓ lens

Noise removal filter: smoothing 3×3

Surface correction: Correction with quadratic polynomial approximation surface

Measurement software: VS-Measure Version 5.5.2

Analysis software: VS-viewer Version 5.5.5

$$S_a = \frac{1}{A}\int_A\int |Z(x,y)|dxdy \quad \text{[Math. 2]}$$

As described above, after a surface roughness is measured at at least 5 points in the longitudinal direction of the magnetic tape MT, the average value of each arithmetic mean roughness $S_a$ (nm) automatically calculated from a surface profile obtained at each position is set to be a surface roughness $R_b$ (nm) of the back surface.

(Young's Modulus of Magnetic Tape in Longitudinal Direction)

A Young's modulus of the magnetic tape MT in the longitudinal direction is preferably 8.0 GPa or less, more preferably 7.9 GPa or less, still more preferably 7.5 GPa or less, and particularly preferably 7.1 GPa or less. When the Young's modulus of the magnetic tape MT in the longitudinal direction is 8.0 GPa or less, the degree of expansion and contraction of the magnetic tape MT due to an external force further increases, and thus it is easier to adjust the width of the magnetic tape MT by adjusting the tension. Therefore, it is possible to more appropriately minimize off-track errors, and it is possible to more accurately reproduce data recorded in the magnetic tape MT.

The Young's modulus of the magnetic tape MT in the longitudinal direction is a value indicating a lower likelihood of expansion and contraction of the magnetic tape MT in the longitudinal direction due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Here, the Young's modulus of the magnetic tape MT in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, in consideration of tension adjustment, a smaller Young's modulus of the magnetic tape MT in the longitudinal direction is advantageous.

A tensile strength tester (AG-100D manufactured by Shimadzu Corporation) is used to measure the Young's modulus. In a case where it is desired to measure the Young's modulus of the tape in the longitudinal direction, the tape is cut to a length of 180 mm to prepare a measurement sample. A jig that can fix the width (½ inch) of the tape is attached to the tensile strength tester, and the top and bottom of the tape width are fixed. The distance (the length of the tape between chucks) is 100 mm. After the tape sample is chucked, stress is gradually applied in the direction in which the sample is pulled. A tensile speed is set to 0.1 mm/min. The Young's modulus is calculated using the following formula from the change in the stress and the amount of elongation in this case.

$$E(N/m^2)=((\Delta N/S)/(\Delta x/L))\times 10^6$$

ΔN: Change in stress (N)

S: Cross-sectional area of test piece (mm²)

Δx: Amount of elongation (mm)

L: Distance between gripping jigs (mm)

The range of stress is set to be from 0.5 N to 1.0 N, and a change in stress (ΔN) and the amount of elongation (Δx) at this time are used in the calculation. Note that the measurement of the Young's modulus is performed under an environment of 25° C. and 50% RH f 5% RH.

(Young's Modulus of Substrate in Longitudinal Direction)

A Young's modulus of the substrate 41 in the longitudinal direction is preferably 7.5 GPa or less, more preferably 7.4 GPa or less, still more preferably 7.0 GPa or less, and particularly preferably 6.6 GPa or less. When the Young's modulus of the substrate 41 in the longitudinal direction is 7.5 Gpa or less, the degree of expansion and contraction of the magnetic tape MT due to an external force further increases, and thus it is easier to adjust the width of the magnetic tape MT by adjusting the tension. Therefore, it is possible to more appropriately minimize off-track errors, and it is possible to more accurately reproduce data recorded in the magnetic tape MT.

The Young's modulus of the substrate 41 in the longitudinal direction is obtained as follows. First, the underlayer 42, the magnetic layer 43 and the back layer 44 are removed from the magnetic tape MT to obtain the substrate 41. The Young's modulus of the substrate 41 in the longitudinal direction is obtained using the substrate 41 in the same procedure as in the above Young's modulus of the magnetic tape MT in the longitudinal direction.

The thickness of the substrate 41 occupies more than half of the thickness of the entire magnetic tape MT. Therefore, the Young's modulus of the substrate 41 in the longitudinal direction correlates with a lower likelihood of expansion and contraction of the magnetic tape MT due to an external force, and when this value is larger, the magnetic tape MT is less likely to expand and contract in the width direction due to an external force, and when this value is smaller, the magnetic tape MT is more likely to expand and contract in the width direction due to an external force.

Here, the Young's modulus of the substrate 41 in the longitudinal direction is a value related to the magnetic tape MT in the longitudinal direction, and but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, in consideration of tension adjustment, a smaller Young's modulus of the substrate 41 in the longitudinal direction is advantageous.

(Height Range ΔH, Gradient Range ΔA)

A height range ΔH (see FIG. 16) obtained from statistical information (distribution) of the height of an uneven shape on the surface of the magnetic layer 43 is 4.00 nm≤ΔH≤10.00 nm, and preferably 4.00 nm≤ΔH≤8.50 nm. When the height range ΔH is ΔH≤4.00 nm, the magnetic head sticks to the magnetic tape MT, and thus it becomes difficult for the magnetic tape MT to run. On the other hand, when the height range ΔH is 10.00 nm<ΔH, an electromagnetic conversion characteristic (for example, SNR) deteriorates due to a spacing loss.

A gradient range ΔA (see FIG. 16) obtained from statistical information (distribution) of the gradient of an uneven shape on the surface of the magnetic layer 43 is 2.50 degrees ≤ΔA, and preferably 2.50 degrees ≤ΔA≤5.00 degrees. When the gradient range ΔA is ΔA<2.50 degrees, a relative friction increases, and thus running stability of the magnetic tape MT decreases. On the other hand, when the gradient range ΔA is 5.00 degrees <ΔA, the gradient of a protrusion on the surface of the magnetic layer 43 becomes excessively steep, and the protrusion is scraped when the magnetic tape MT is running, so that powder falls off.

A method of calculating the height range ΔH and the gradient range ΔA will be described in the following order.

(1) Surface profile measurement (AFM)
(2) Calculation of relative height at each point
(3) Calculation of gradient at each point
(4) Statistical processing of data of height and gradient
(5) Calculation of height range ΔH
(6) Calculation of gradient range ΔA (1) Surface Profile Measurement (AFM)

By measuring a two-dimensional surface profile of the surface (magnetic surface) of the magnetic layer 43 of the magnetic tape MT, a numerical data matrix of a height ζ(L, W) is obtained from a two-dimensional surface profile image after a filter action. Note that measurement conditions are as follows.

Figure 8:
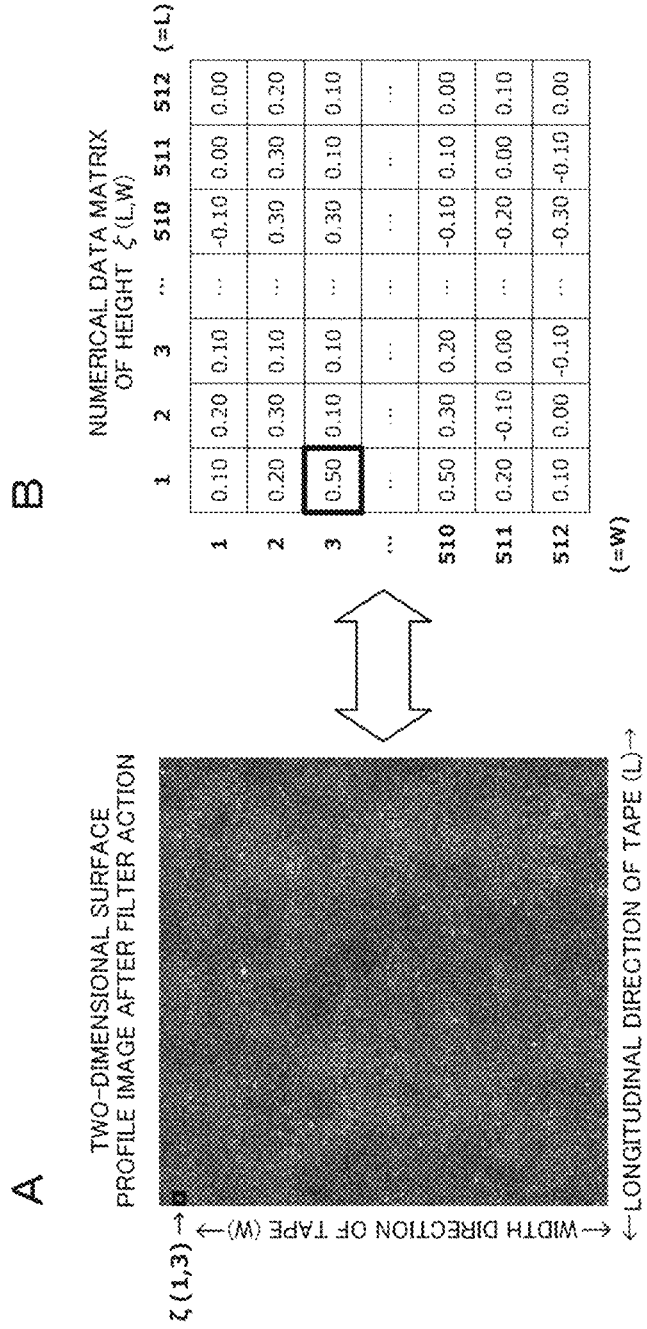
FIG. 8A is a diagram illustrating an example of a two-dimensional surface profile image after a filter action.
FIG. 8B is a diagram illustrating an example of a numerical data matrix of a height $\zeta(L, W)$.

Measurement device: AFM (device name: Nanoscope Dimension 3100 manufactured by Digital Instruments Corporation)
Measurement range: 40 μm×40 μm
Number of measurement points: 512 points×512 points
Scan rate: 1 Hz
Filter condition: [Flatten] order 2
[Plane Fit] order 3, XY FIG. 8A is a diagram illustrating an example of a two-dimensional surface profile image after a filter action. FIG. 8B is a diagram illustrating an example of a numerical data matrix of a height ζ(L, W) at each point (L, W). The coordinate L indicates a coordinate in the longitudinal direction of the magnetic tape MT, and the coordinate W indicates a coordinate in the width direction of the magnetic tape MT. A height ζ(L, W) at each point (L, W) is written in each cell of a numerical data matrix. In the example illustrated in FIG. 8B, for example, a height ζ(1,3) at a measurement point (1,3) is "0.50". The number of pieces of numerical data (that is, height ζ(L, W)) is a total of 512× 512=262,144.

(2) Calculation of Relative Height at Each Point

A relative height Z(L, W) at each point (L, W) (hereinafter, referred to simply as a "height Z(L, W)") is calculated from the numerical data matrix of a height ζ(L, W) to obtain a numerical data matrix of a height Z(L, W). The height Z(L, W) at each point (L, W) is obtained specifically as follows. That is, an average value is obtained by simply averaging (taking an arithmetic mean of) all of the heights ζ(L, W) and is set to be an average center height $\zeta_{ave}$. Then, the height ζ(L, W) at each point (L, W) is converted into a relative height based on the average center height $\zeta_{ave}$ to obtain a height Z(L, W) at each point (L, W). A formula representing a method of calculating the height Z(L, W) is as follows. FIG. 9 is a diagram illustrating an example of a numerical data matrix of a height Z(L, W).

$$\zeta_{ave} = \frac{\sum_{W=1}^{512}\sum_{L=1}^{512} \zeta(L, W)}{512 \times 512} \quad \text{[Math. 3]}$$

$$Z(L,W) = \zeta(L,W) - \zeta_{ave} \quad \text{[Math. 4]}$$

(3) Calculation of Gradient at Each Point

FIG. 10 is a diagram illustrating a method of calculating gradients $G_L(L, W)$ and $G_W(L, W)$ at each point (L, W). Here, the gradient $G_L(L, W)$ indicates a gradient in the longitudinal direction of the magnetic tape MT, and the gradient $G_W(L, W)$ indicates a gradient in the width direction of the magnetic tape MT.

By calculating the gradients $G_L(L, W)$ and $G_W(L, W)$ in two directions at each point (L, W) from a numerical data matrix of a height ζ(L, W), a numerical data matrix of each of the gradients $G_L(L, W)$ and $G_W(L, W)$ is obtained. FIG. 11A is a diagram illustrating an example of the numerical data matrix of the gradient $G_L(L, W)$.

FIG. 11B is a diagram illustrating an example of the numerical data matrix of the gradient $G_W(L, W)$.

The gradient $G_L(L, W)$ is calculated as follows. The gradient $G_L(L, W)$ is calculated using a height ζ(L, W) at a certain point (L, W) and a height ζ(L+1, W) at a point (L+1, W) adjacent to the point (L, W) in the longitudinal direction of the magnetic tape MT. As illustrated in FIG. 10, for example, a gradient $G_L(2,2)$ is calculated using a height $\zeta(2,2)$ (=0.30) at a point (2,2) and a height $\zeta(3,2)$ (=0.10) at a point (3,2).

The gradient $G_W(L, W)$ is calculated as follows. The gradient $G_W(L, W)$ is calculated using a height $\zeta(L, W)$ at a certain point (L, W) and a height $\zeta(L, W+1)$ at a point (L, W+1) adjacent to the point (L, W) in the width direction of the magnetic tape MT. As illustrated in FIG. 10, for example, the gradient $G_W(2,2)$ is calculated using a height $\zeta(2,2)$ (=0.30) at a point (2,2) and a height $\zeta(2,3)$ (=0.10) at a point (2,3).

As described above, the "adjacent point" used at the time of calculating $G_L(L, W)$ at each point (L, W) is a point (L+1, W). An adjacent point in the opposite direction, that is, a point (L-1, W) should not be used. Similarly, the "adjacent point" used at the time of calculating $G_W(L, W)$ at each point (L, W) is a point (L, W+1). An adjacent point in the opposite direction, that is, a point (L, W-1) should not be used.

As illustrated in FIG. 10, a gradient $G_L(512, W)$ cannot be calculated at each point (512, W) of L=512 (that is, the rightmost column in FIG. 10) of the numerical data matrix. For this reason, as illustrated in FIG. 11A, each point (512, W) of L=512 does not have a value in the numerical data matrix of the gradient $G_L(L, W)$. On the other hand, as illustrated in FIG. 10, a gradient $G_W(L, 512)$ cannot be calculated at each point (L, 512) of W=512 (that is, the lowermost row in FIG. 10) of the numerical data matrix. For this reason, as illustrated in FIG. 11B, each point (L, 512) of W=512 does not have a value in the numerical data matrix of the gradient $G_W(L, W)$.

However, as illustrated in FIG. 10, both a gradient $G_L(512, 512)$ and a gradient $G_W(512, 512)$ cannot be calculated at points (L, W) of L=512, W=512 (the rightmost and lowermost column and the lowermost row) of the numerical data matrix, and thus a point (512, 512) does not have both the gradient $G_L(512, 512)$ and the gradient $G_W(512, 512)$.

FIG. 12A is a diagram illustrating a method of calculating a gradient $G_L(L, W)$. FIG. 12B is a diagram illustrating a method of calculating a gradient $G_W(L, W)$. A formula representing a method of calculating the gradients $G_L(L, W)$ and $G_W(L, W)$ is as follows.

$$G_L(L, W)[°] = \tan^{-1}\left(\frac{|\zeta(L+1, W) - \zeta(L, W)|}{78.125}\right) \quad \text{[Math. 5]}$$

$$G_W(L, W)[°] = \tan^{-1}\left(\frac{|\zeta(L, W+1) - \zeta(L, W)|}{78.125}\right) \quad \text{[Math. 6]}$$

(4) Statistical Processing of Data of Height and Gradient

Figure 13:
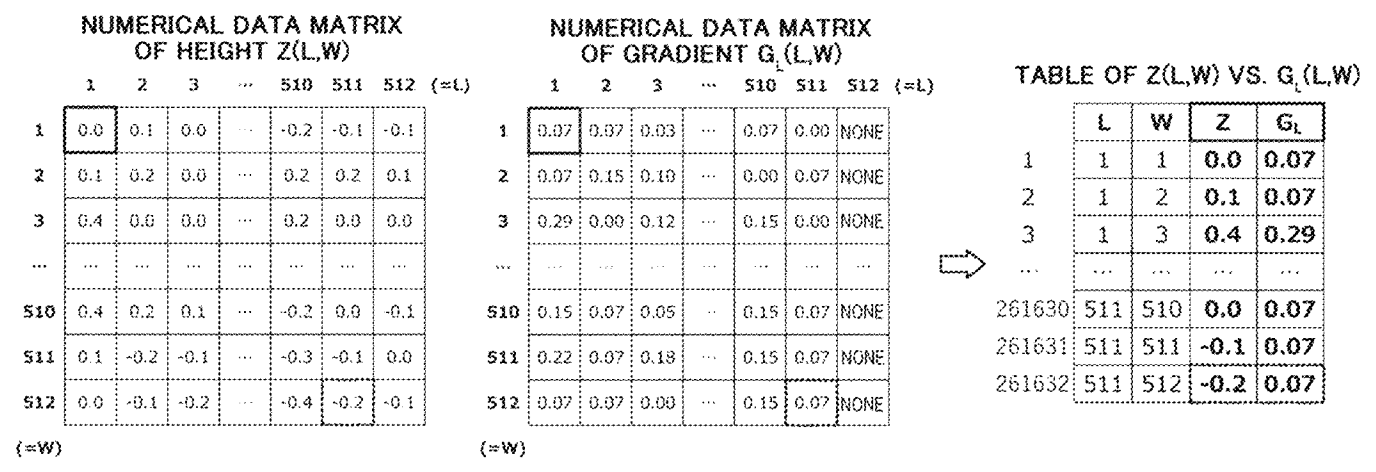
Figure 15:
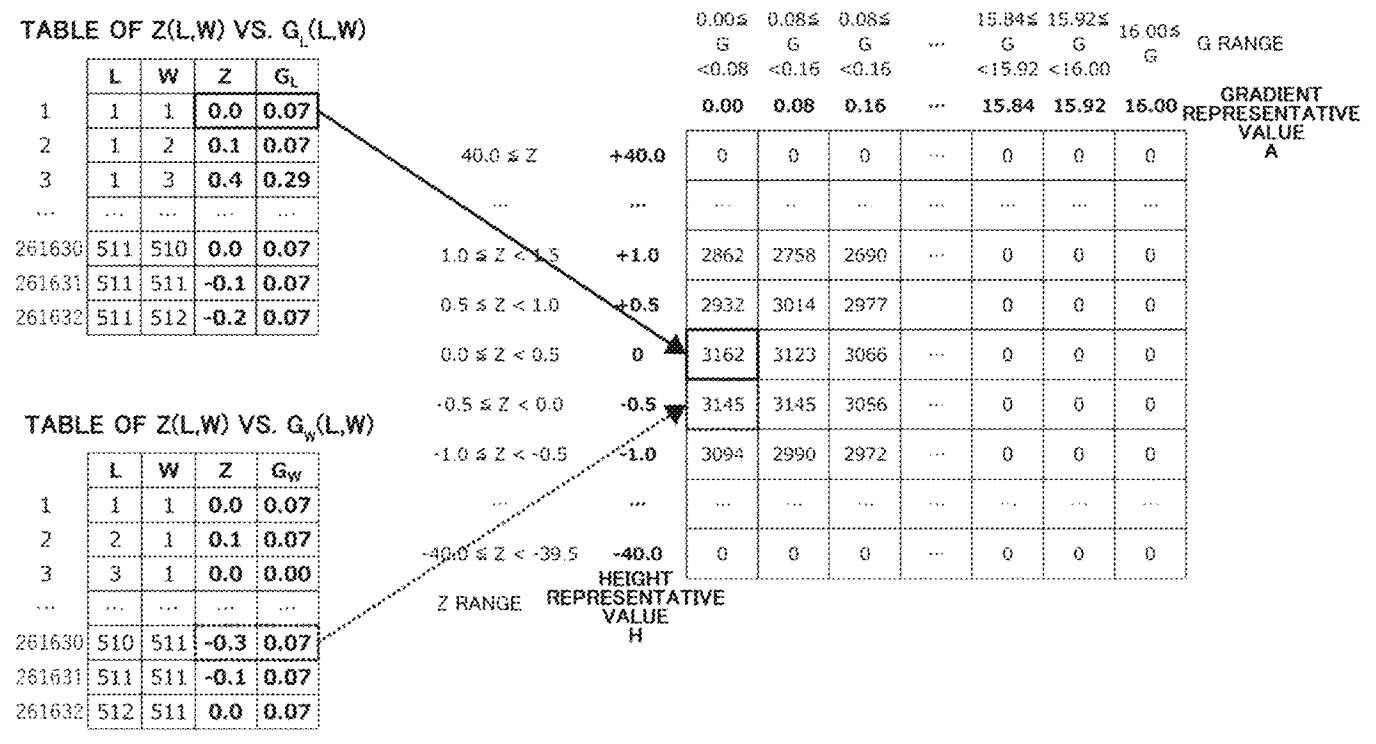

FIGS. 13, 14, and 15 are diagrams illustrating statistical processing of data of the height Z(L, W), the gradient $G_L(L, W)$, and the gradient $G_W(L, W)$. A numerical data matrix of the height Z(L, W) and the gradient $G_L(L, W)$ which are obtained as described above is organized, and a table (see FIG. 13) representing a relationship between the height Z(L, W) and the gradient $G_L(L, W)$ is created. However, since there is no gradient $G_L(512, W)$, a total number of pieces of data in the created table is 511×512=261,632.

In addition, a numerical data matrix of the height Z(L, W) and the gradient $G_W(L, W)$ is organized, and a table (see FIG. 14) representing a relationship between the height Z(L, W) and the gradient $G_W(L, W)$ is created. However, since there is no $G_W(L, 512)$, a total number of pieces of data in the created table is 512×511=261,632.

All of the pieces of data of the two created tables (that is, 523,264=261,632+261,632) are aggregated, and a numerical data matrix of the number of pieces of data M(H, A) is created as illustrated in FIG. 15. When numerical values of cells of the numerical data matrix of the number of pieces of data M(H, A) are added, a total number of pieces of data is 523,264.

In FIG. 15, the range of a height Z(L, W) and its representative value H are described alongside the column of the numerical data matrix of the number of pieces of data M(H, A). In addition, the range of a gradient G(L, W) and its representative value A are described alongside the row of the numerical data matrix of the number of pieces of data M(H, A). Note that, in a case where the gradient $G_L(L, W)$ and the gradient $G_W(L, W)$ are not particularly distinguished from each other, the gradient $G_L(L, W)$ and the gradient $G_W(L, W)$ will be collectively referred to as a gradient G(L, W).

Numerical values (see FIG. 15) of cells of the numerical data matrix of the number of pieces of data M(H, A) represent the number of pieces of data M(H, A) corresponding to the range of a specified height Z(L, W) and corresponding to the range of a specified gradient G(L, W) (specifically, the gradient $G_L(L, W)$ or the gradient $G_W(L, W)$). For example, data in a first row of a table of Z(L, W) vs. $G_L(L, W)$ is counted in a (H, A)=(0.0, 0.00) cell in M(H, A). In addition, 261630th data in a table of Z(L, W) vs. $G_W(L, W)$ is counted in a (H, A)=(−0.5, 0.00) cell in M(H, A).

Figure 16:
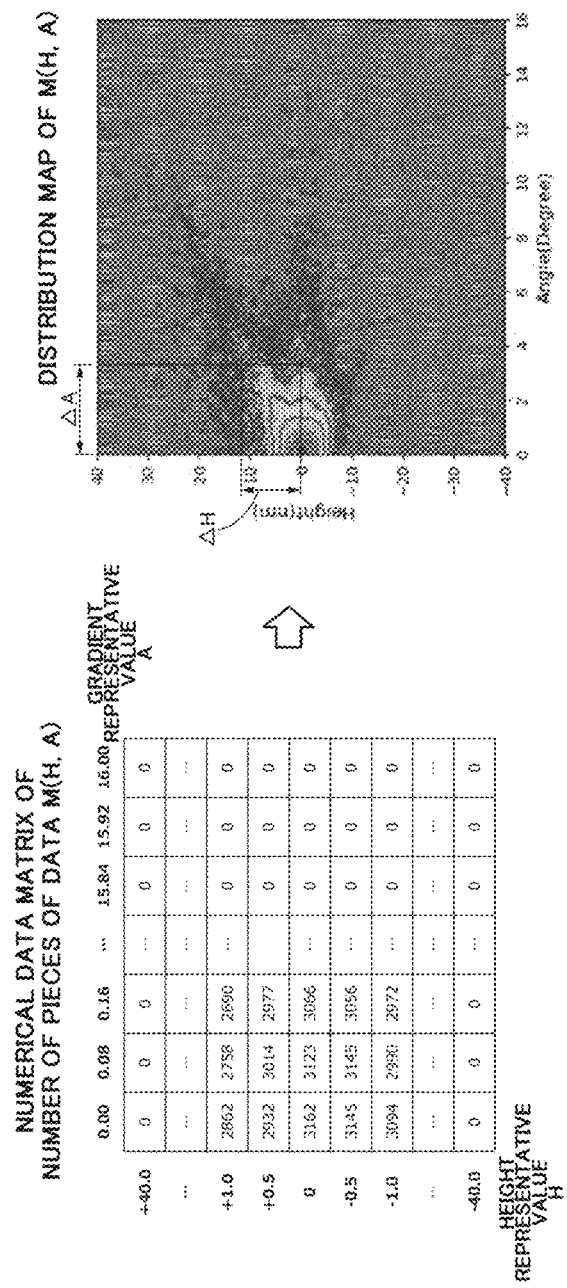
FIG. 16 is a diagram illustrating a procedure of creating a distribution map from a numerical data matrix of the number of pieces of data M(H, A).

When the numerical data matrix M(H, A) (see FIG. 15) obtained as described above is drawn as a distribution map on a horizontal axis A and a vertical axis H, FIG. 16 is obtained.

(5) Calculation of Height Range ΔH

Figure 18:
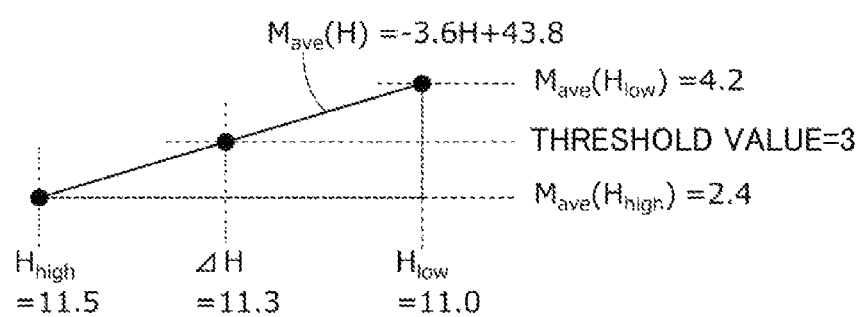
FIG. 18 is a diagram illustrating a method of calculating a height range $\Delta H$.

FIGS. 17 and 18 are diagrams illustrating a method of calculating a height range ΔH. When the height range ΔH is calculated, only components (cells) in the range of 0≤H, 0.00≤A≤1.20 in the numerical data matrix of the number of pieces of data M(H, A) are used. Regarding the height H, only components in the range of 0≤H are used because only a convex portion on a magnetic surface is taken into consideration. That is, this is because it is considered that a concave portion on the magnetic surface does not affect electromagnetic conversion characteristics and friction. On the other hand, regarding the gradient A, only components in the range of 0.00≤A≤1.20 are used because it is considered that it is sufficient to define a rough outline of distribution (see FIG. 16) when even this range is used in the calculation.

As illustrated in FIG. 17, an average value in each row (height H) of the numerical data matrix of the number of pieces of data M(H, A) is set to be $M_{ave}(H)$, and calculation is sequentially performed from an average value $M_{ave}(0)$ to an average value $M_{ave}(40.0)$. However, in the calculation of the average value $M_{ave}(H)$, regarding a column (angle A), only components of columns (angle A) in the range of 0.00≤A≤1.20 are used.

A height H when the average value $M_{ave}(H)$ falls below a threshold value (where, the threshold value is set to "3") for the first time is set to be a height $H_{high}$, and an average value $M_{ave}(H)$ at that time is set to be an average value $M_{ave}(H_{high})$. Further, one height H prior to the height is set to be a height $H_{low}$, and an average value $M_{ave}(H)$ at that time is set to be an average value $M_{ave}(H_{low})$. When the threshold value is set to "1" or "2", reproducibility deteriorates. That is, an accidental factor has a great influence. Thus, "3" which is the least frequency at which reproducibility can be secured is set to be a threshold value.

In the example of FIG. 17, the height $H_{high}$, the average value $M_{ave}(H_{high})$, the height $H_{low}$, and the average value $M_{ave}(H_{low})$ are as follows.

$$H_{high}=11.5, M_{ave}(H_{high})=2.4$$

$$H_{low}=11.0, M_{ave}(H_{low})=4.2$$

As illustrated in FIG. 18, a height H is calculated when $M_{ave}(H)$=threshold value=3 by using the four values, and is defined as a height range ΔH. Note that, when the height H is calculated, a linear approximation between two points is used.

(6) Calculation of Gradient Range ΔA

Figure 20:
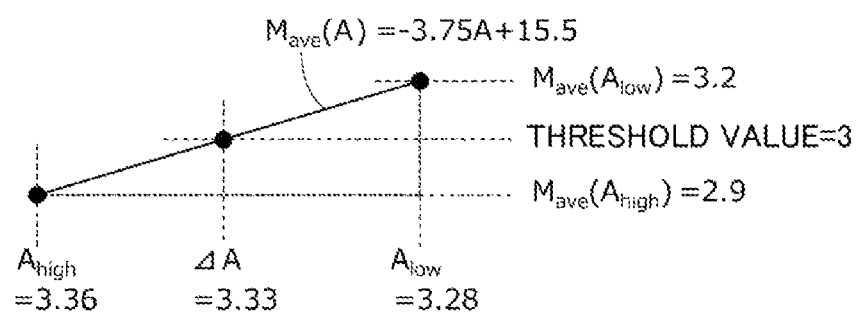
FIG. 20 is a diagram illustrating a method of calculating a gradient range $\Delta A$.

FIGS. 19 and 20 are diagrams illustrating a method of calculating a gradient range ΔA. When the gradient range ΔA is calculated, only components (cells) in the range of 0≤H≤ΔH, 0.00≤A≤16.00 in the numerical data matrix of the number of pieces of data M(H, A) are used. Regarding ΔH, the value obtained in the above-described "(5) Calculation of height range ΔH" is used. Regarding the gradient A, only components in the range of 0.00≤A≤16.00 are used because the gradient A is generally in the range of 0.00≤A≤16.00, and it is considered that it is sufficient to use even this range for the calculation.

As illustrated in FIG. 19, an average value of pieces of data M(H, A) in each column (angle A) of the numerical data matrix of M(H, A) is set to be $M_{ave}(A)$, and calculation is sequentially performed from an average value $M_{ave}(0)$ to an average value $M_{ave}(16.00)$. However, in the calculation of the average value $M_{ave}(A)$, regarding a row (height H), only components of rows (height H) in the range of 0.00≤H≤ΔH are used.

In a case where the height range ΔH is not a multiple of 0.5, components of rows (height H) in the range up to the height $H_{low}$, which are used in the calculation of the height range ΔH are used to calculate the average value $M_{ave}(A)$. For example, as illustrated in FIG. 19, in a case where the height range ΔH is in a range between 11.0 and 11.5, components of rows (height H) in the range of 0.00≤H≤11.0 are used.

A when the average value $M_{ave}(A)$ falls below a threshold value (where, the threshold value is set to "3") for the first time is set to be $A_{high}$, and an average value $M_{ave}(A)$ at that time is set to be average value $M_{ave}(A_{high})$. Further, one angle A prior to the angle is set to be an angle $A_{low}$, and an average value $M_{ave}(A)$ at that time is set to be an average value $M_{ave}(A_{low})$. The reason why the threshold value of the average value $M_{ave}(A)$ is set to "3" is the same as the reason why the threshold value of the average value $M_{ave}(H)$ is set to "3".

In the example of FIG. 19, $A_{high}$, $M_{ave}(A_{high})$, $A_{low}$, and $M_{ave}(A_{low})$ are as follows.

$$A_{high}=3.36, M_{ave}(A_{high})=2.9$$

$$A_{low}=3.28, M_{ave}(A_{low})=3.2$$

As illustrated in FIG. 20, an angle A is calculated when $M_{ave}(A)$=threshold value=3 by using the four values, and is defined as a gradient range ΔA. Note that, when the angle A is calculated, a linear approximation between two points is used.

(Amount of Oozing of Lubricant)

The amount of oozing (oozing area) of a lubricant per unit region of 12.5 μm×9.3 μm on the surface of the magnetic layer 43 in vacuum is 3.0 μm² or more and 6.5 μm² or less, and preferably 3.5 μm² or more and 6.5 μm² or less. The amount of oozing of the lubricant on the surface of the magnetic layer 43 in vacuum corresponds to the amount of lubricant that can be supplied when the magnetic tape MT is running. When the amount of oozing of the lubricant (area) is less than 3.0 μm², the amount of lubricant on the surface of the magnetic layer 43 is excessively small, and thus a dynamic friction coefficient increases when recording or reproducing is repeatedly performed. On the other hand, when the amount of oozing of the lubricant (area) exceeds 6.5 μm², the amount of lubricant on the surface of the magnetic layer 43 is excessively large, and thus a surface portion of the magnetic layer 43 is plasticized due to the lubricant, and the hardness of the surface of the magnetic layer 43 deteriorates. Thus, the head is in excessively close contact with the magnetic tape MT when the magnetic tape MT is running, and thus a dynamic friction coefficient increases. Hereinafter, the amount of oozing of a lubricant per unit region 12.5 μm×9.3 μm on the surface of the magnetic layer 43 in vacuum may be referred to simply as "the amount of oozing of a lubricant".

The amount of oozing of a lubricant (area) is obtained as follows. First, the magnetic tape MT is cut by 5 cm, stuck to a slide glass, and installed in an MSP-1S type magnetron sputtering device manufactured by Vacuum Device Co., Ltd. The magnetic layer 43 is attached with the surface thereof facing up. Next, pressure in the sputtering device is reduced to 4 Pa. Thereafter, a target (Φ51 mm, thickness of 0.1 mm, material: Pt—Pd) manufactured by Vacuum Device Co., Ltd. is sputtered for 6 seconds to form a Pt—Pd alloy on the surface (magnetic surface) of the magnetic layer 43. A sputtering film is unlikely to be formed at a location where a lubricant is present, whereas a sputtering film is likely to be formed at a location where a lubricant is not present. For this reason, the sputtering film is unevenly distributed in a portion in which a lubricant is present and a portion in which a lubricant is not present. Next, the surface of the magnetic layer 43 is observed with a scanning electron microscope (SEM) under the following conditions to obtain a Tif file (1260×960 pixels) of an SEM image (black and white shading image) of the observed surface. Note that, in the SEM image, a part that looks black corresponds to a part in which a lubricant is present.

Device: Hitachi High-Technologies Corporation, S-4800
Acceleration voltage: 5 kV
Magnification: 10000×

Next, the amount of oozing of a lubricant (area) is obtained as follows from an SEM image (Tif file) of the obtained unit region of 12.5 μm×9.3 μm by using image analysis software (ImageJ). First, scaling of the obtained SEM image is performed (scaling setting conditions: distance=504, known=5, pixel=1, unit=um (micrometer)). Next, the scaled SEM image (black and white shading image) is divided into 256 gradations, and the SEM image is binarized with 70 gradations as a threshold value. Specifically, when a pixel has 70 gradations or less, the pixel is "black", and when a pixel exceeds 70 gradations, the pixel is "white". FIG. 21A illustrates an example of the binarized SEM image. A part displayed in "black" by binarization corresponds to a part in which a lubricant is present on the surface of the magnetic layer 43.

Next, a total area of dots (black portion) having an area of 0.02 μm² or more is obtained from the binarized SEM image by Analyze Particles of ImageJ (particle analysis). Here, the reason why a dot having an area less than 0.02 μm² is excluded is because there is a possibility that a dot having an area less than 0.02 µm² will be a particle such as carbon black, and even when a dot having an area less than 0.02 µm² is a lubricant, it has little effect on running performance.

FIG. 21B illustrates an example of an outline image of a dot having an area of 0.02 µm² or more.

Details of setting of Analyze Particles are as follows.
Size: 0.02-Infinity
Show: Outlines The above-described calculation of a total area is performed at three locations randomly selected from a slide glass, and calculation results are simply averaged (arithmetic mean) to obtain the amount of oozing of a lubricant.

(Friction Coefficient)

A friction coefficient ratio ($\mu_B/\mu_A$) between a dynamic friction coefficient $\mu_B$ obtained after full-scale recording/full-scale reproduction is performed twice and a dynamic friction coefficient $\mu_A$ before the full-scale recording/full-scale reproduction is performed is preferably less than 2.0, more preferably 1.5 or less, still more preferably 1.3 or less, and particularly preferably 1.1 or less. When the friction coefficient ratio ($\mu_B/\mu_A$) is less than 2.0, it is possible to suppress the occurrence of defective data writing and reading due to sticking and running instability in the third recording/reproducing and the subsequent recording/reproducing processes. Here, the "full-scale recording/full-scale reproduction" means that data having a maximum uncompressed capacity (for example, 6 TB in the case of LTO7) of a cartridge is continuously written, and then all of the written information is reproduced. For "full-scale recording/full-scale reproduction", it is assumed that a drive compatible with the magnetic tape MT is used as a magnetic head. In addition, it is assumed that "full-scale recording/full-scale reproduction" is performed at room temperature.

Figure 22:
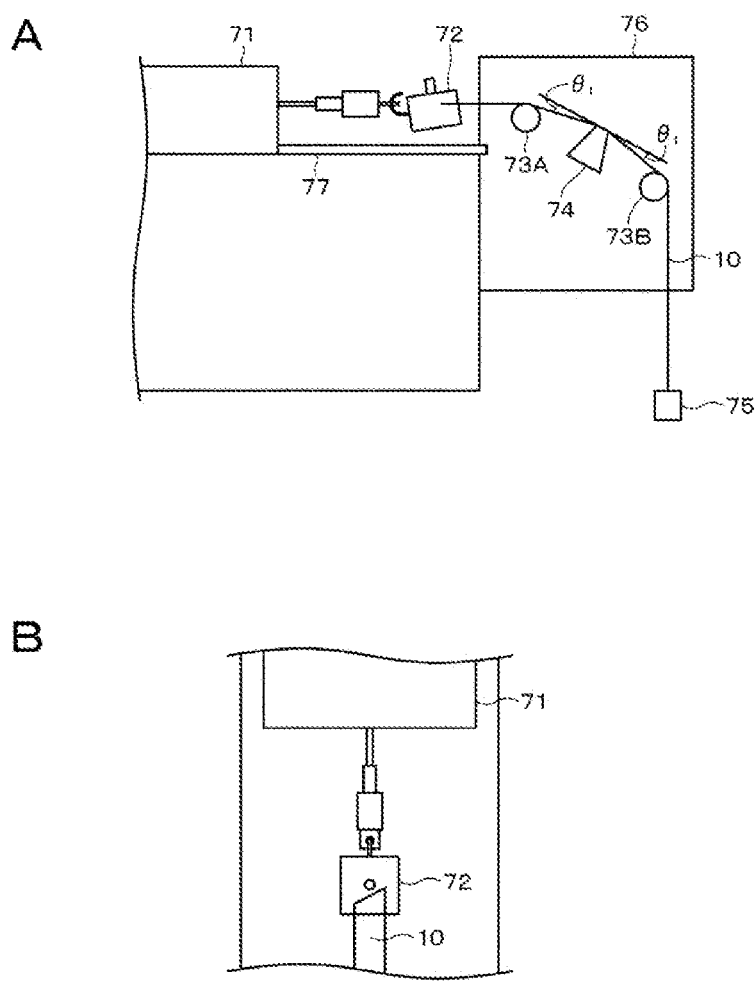
FIGS. 22A and 22B are schematic diagrams illustrating a method of measuring a friction coefficient between a magnetic surface and a magnetic head.

The friction coefficient ratio ($\mu_B/\mu_A$) is obtained as follows. First, after full-scale recording/full-scale reproduction is performed twice on the magnetic tape MT, the magnetic tape MT is unwound from the cartridge 10, and a portion 2 m from a connection portion between a leader tape portion and the magnetic tape MT is set to be a "portion before full-scale recording/full-scale reproduction is performed twice" (hereinafter, referred to as a "non-recording/reproducing portion"). In addition, a portion 50 m from the connection portion between the reader tape portion and the magnetic tape MT is set to be a "portion on which full-scale recording/full-scale reproduction has been performed twice" (hereinafter, referred to as a "recording/reproducing portion"). Next, as illustrated in FIG. 22A, the magnetic tape MT of the non-recording/reproducing portion is placed on two columnar guide rolls 73A and 73B so that the magnetic surface thereof is in contact with the guide rolls 73A and 73B, the guide rolls having a diameter of 1 inch and being disposed separately and in parallel with each other. The two guide rolls 73A and 73B are fixed to a hard plate-shaped member 76, whereby a positional relationship therebetween is fixed.

Next, the magnetic tape MT is brought into contact with a head block (for recording and reproduction) 74 mounted on an LTO5 drive so that the magnetic surface of the magnetic tape MT is in contact with the head block and a holding angle θ1 (°)=5.6 degrees. The head block 74 is disposed substantially between the guide rolls 73A and 73B. Although the head block 74 is attached to be movable to the plate-shaped member 76 so as to be able to change the holding angle θ1, the position of the head block is fixed to the plate-shaped member 76 when the holding angle θ1 (°) is set to 5.6 degrees, and thus a positional relationship between the guide rolls 73A and 73B and the head block 74 is also fixed.

One end portion of the magnetic tape MT is connected to a movable strain gauge 71 via a jig 72. The magnetic tape MT is fixed to the jig 72 as illustrated in FIG. 22B. A weight 75 is connected to the other end of the magnetic tape MT. A tension (T₀ [N]) of 0.6 N is applied in the longitudinal direction of the magnetic tape MT by the weight 75. The movable strain gauge 71 is fixed onto a stand 77. A positional relationship between the stand 77 and the plate-shaped member 76 is also fixed, and thus a positional relationship between the guide rolls 73A and 73B, the head block 74, and the movable strain gauge 71 is fixed.

The movable strain gauge 71 slides the magnetic tape MT 60 mm on the head block 74 (outward path) so that the magnetic tape MT is directed toward the movable strain gauge 71 at 10 mm/s, and slides the magnetic tape MT 60 mm so as to be away from the movable strain gauge (return path). An output value (voltage) of the movable strain gauge 71 at the time of the sliding is converted into a load T[N] on the basis of a linear relationship between an output value acquired in advance and a load (which will be described later). T [N] is acquired 13 times from the start of the 60 mm sliding to the stop of the sliding, and 11 values of T [N] except for the first and last two values are simply averaged to obtain Tave [N]. Thereafter, a dynamic friction coefficient $\mu_A$ is obtained by the following formula.

$$\mu_A = \frac{1}{(\theta_1[°]) \times (\pi/180)} \times \ln\left(\frac{T_{ave}[N]}{T_0[N]}\right) \quad \text{[Math. 7]}$$

The linear relationship is obtained as follows. That is, an output value (voltage) of the movable strain gauge 71 is obtained for each of a case where a load of 0.5 N is applied to the movable strain gauge 71 and a case where a load of 1.0 N is applied to the movable strain gauge 71. A linear relationship between an output value and a load is obtained from the obtained two output values and the two loads. The output value (voltage) of the movable strain gauge 71 at the time of the sliding is converted into T [N] as described above using the linear relationship.

Next, a dynamic friction coefficient $\mu_B$ is obtained from the magnetic tape MT of the recording/reproducing portion according to the same procedure as when the dynamic friction coefficient $\mu_A$ is obtained from the magnetic tape MT of the non-recording/reproducing portion.

A friction coefficient ratio ($\mu_B/\mu_A$) is calculated from the dynamic friction coefficient $\mu_A$ and the dynamic friction coefficient $\mu_B$ obtained as described above.

4 METHOD OF MANUFACTURING MAGNETIC TAPE

Next, an example of a method of manufacturing a magnetic tape MT having the above-described configuration will be described.

(Preparation Process of Coating Material)

First, an underlayer forming coating material is prepared by kneading and dispersing a non-magnetic powder, a binding agent, and the like in a solvent. Next, a magnetic layer forming coating material is prepared by kneading and dispersing a magnetic powder, a binding agent, and the like in a solvent. For example, the following solvents, a dispersion device, and a kneading device can be used to prepare the magnetic layer forming coating material and the underlayer forming coating material.

Examples of solvents used to prepare the above-described coating materials include ketone-based solvents such as acetone, methyl ethyl ketone, methyl isobutyl ketone and cyclohexanone, alcohol-based solvents such as methanol, ethanol and propanol, ester-based solvents such as methyl acetate, ethyl acetate, butyl acetate, propyl acetate, ethyl lactate and ethylene glycol acetate, ether-based solvents such as diethylene glycol dimethyl ether, 2-ethoxyethanol, tetrahydrofuran and dioxane, aromatic hydrocarbon-based solvents such as benzene, toluene and xylene, halogenated hydrocarbon-based solvents such as methylene chloride, ethylene chloride, carbon tetrachloride, chloroform, and chlorobenzene, and the like. These may be used alone or mixed appropriately.

As a kneading device used to prepare the above-described coating material, for example, kneading devices such as a continuous twin-screw kneader, a continuous twin-screw kneader that can perform dilution in multiple stages, a kneader, a pressure kneader, and a roll kneader can be used, but the present disclosure is not limited to these devices. In addition, as the dispersion device used to prepare the above-described coating materials, for example, dispersion devices such as a roll mill, a ball mill, a horizontal sand mill, a vertical sand mill, a spike mill, a pin mill, a tower mill, a pearl mill (for example, a "DCP mill" manufactured by Erich), a homogenizer, and an ultrasonic disperser can be used, but the present invention is not particularly limited to these devices.

(Application Process)

Next, an underlayer forming coating material is applied to one main surface of the substrate 41 and dried to form the underlayer 42. Subsequently, a magnetic layer forming coating material is applied onto the underlayer 42 and dried to form the magnetic layer 43 on the underlayer 42. Note that, at the time of the drying, a magnetic powder is magnetically oriented in the thickness direction of the substrate 41 by, for example, a solenoid coil. In addition, at the time of the drying, the magnetic powder may be magnetically oriented in a running direction (longitudinal direction) of the substrate 41 by, for example, a solenoid coil, and then magnetically oriented in the thickness direction of the substrate 41. By performing a process of temporarily orienting the magnetic powder in the longitudinal direction in this manner, the degree of vertical orientation of the magnetic powder (that is, the squareness ratio Si) can be further improved. After the magnetic layer 43 is formed, the back layer 44 is formed on the other main surface of the substrate 41. Thereby, the magnetic tape MT is obtained.

The squareness ratios S1 and S2 are set to desired values by adjusting, for example, the strength of a magnetic field applied to a coating film of the magnetic layer forming coating material, the concentration of solid content in the magnetic layer forming coating material, and drying conditions (a drying temperature and a drying time) of the coating film of the magnetic layer forming coating material. The strength of the magnetic field applied to the coating film is preferably 2 times or more and 3 times or less a coercive force of the magnetic powder. In order to further increase the squareness ratio S1 (that is, to further lower the squareness ratio S2), it is preferable to improve the dispersed state of the magnetic powder in the magnetic layer forming coating material. Further, in order to further increase the squareness ratio S1, it is also effective to magnetize the magnetic powder at a stage before magnetic layer forming coating material is injected into an orientation device for magnetically orienting the magnetic powder. Note that the above-mentioned method of adjusting the squareness ratios S1 and S2 may be used alone or in combination of two or more.

(Calendering Process)

Next, the obtained magnetic tape MT is subjected to calendering to smooth the surface of the magnetic layer 43.

A height range $\Delta H$ and a gradient range $\Delta A$ can be set to specified values by adjusting, for example, at least one of (1) the size and content of an additive (particles) to be mixed in the magnetic layer forming coating material, (2) the size and content of a non-magnetic powder to be mixed in the underlayer forming coating material, and (3) calendering conditions (temperature and pressure). The additive to be mixed in the magnetic layer forming coating material is, for example, an abrasive such as a-alumina. The non-magnetic powder to be mixed in the underlayer forming coating material is, for example, needle-like iron oxide powder or the like.

As the size of the additive to be mixed in the magnetic layer forming coating material becomes larger, there is a tendency for the height range $\Delta H$ and the gradient range $\Delta A$ to increase. As the content of the additive to be mixed in the magnetic layer forming coating material increases, there is a tendency for the height range $\Delta H$ and the gradient range $\Delta A$ to increase. As the size of the non-magnetic powder to be mixed in the underlayer forming coating material becomes larger, there is a tendency for the height range $\Delta H$ and the gradient range $\Delta A$ to increase. As the content of the non-magnetic powder to be mixed in the underlayer forming coating material increases, there is a tendency for the height range $\Delta H$ and the gradient range $\Delta A$ to increase. As the temperature of the calendering increases, there is a tendency for the height range $\Delta H$ and the gradient range $\Delta A$ to decrease. As the pressure of the calendering increases, there is a tendency for the height range $\Delta H$ and the gradient range $\Delta A$ to decrease.

The amount of oozing of a lubricant can be set to a specified value by adjusting, for example, conditions of calendering (temperature and pressure). In order to set the amount of oozing of a lubricant to 3.0 $\mu m^2$ or more and 6.5 $\mu m^2$ or less, the temperature of the calendering is preferably in the range of 80° C. or more and 130° C. or less, and the pressure is preferably in the range of 150 kg/cm or more and 350 kg/cm or less. Note that, as the temperature of the calendering increases, there is a tendency for the amount of oozing of a lubricant to decrease. In addition, as the pressure of the calendering increases, there is a tendency for the amount of oozing of a lubricant to decrease. Here, the temperature of the calendering is the surface temperature of a roll that presses the surface of the magnetic layer 43 during the calendering.

The amount of oozing of a lubricant can also be set to a specified value by adjusting, for example, a drying temperature of the coating film of the magnetic layer forming coating material. In order to set the amount of oozing of a lubricant to 3.0 $\mu m^2$ or more and 6.5 $\mu m^2$ or less, the drying temperature is preferably in the range of 60° C. or more and 120° C. or less, and the drying time is preferably in the range of 5 seconds or more and 30 seconds or less. Note that, as the drying temperature increases, there is a tendency for the amount of oozing of a lubricant to increase. In addition, as the drying time increases, there is a tendency for the amount of oozing of a lubricant to increase.

(Cutting Process)

Next, the magnetic tape MT is cut to a predetermined width (for example, a width of ½ inches). In this manner, the magnetic tape MT is obtained.

(Demagnetization Process and Servo Pattern Writing Process)

Next, a servo pattern may be written on the magnetic tape MT after performing demagnetization of the magnetic tape MT as necessary.

5 EFFECTS

As described above, in the magnetic tape MT according to an embodiment, in addition to the height of the uneven shape of the surface of the magnetic layer 43, the inclination of the uneven shape of the surface of the magnetic layer 43 is specified. Specifically, in addition to setting the height range ΔH obtained from statistical information (distribution) of the height of the uneven shape of the surface of the magnetic layer 43 to be in a range of 4.0 nm≤ΔH≤10 nm, the gradient range ΔA obtained from statistical information (distribution) of the gradient of the uneven shape of the surface of the magnetic layer 43 is set to be in a range of 2.5 degrees≤ΔA. Thereby, it is possible to achieve both excellent recording/reproducing characteristics (electromagnetic conversion characteristics) and excellent running stability (low friction).

6 MODIFICATION EXAMPLES

Modification Example 1

In the above-described embodiment, a case where the magnetic tape cartridge is a 1-reel type cartridge 10 has been described, but the magnetic tape cartridge may be 2-reel type cartridge.

Figure 23:
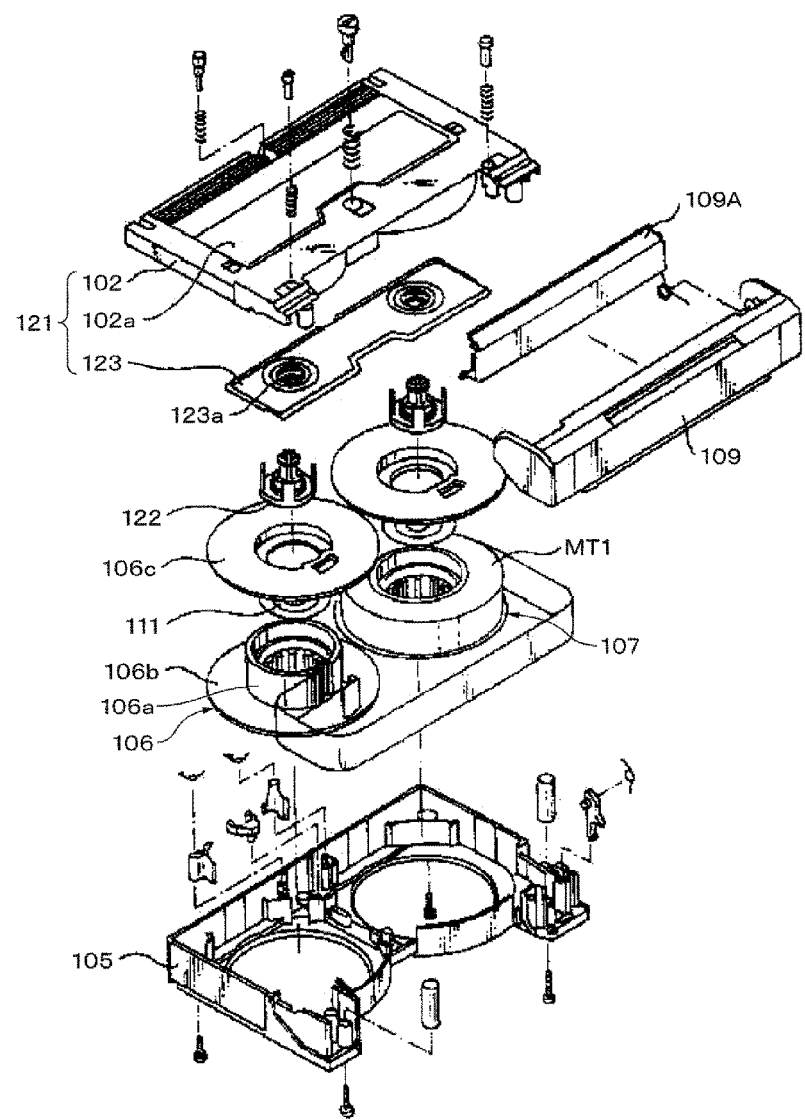
FIG. 23 is an exploded perspective view illustrating an example of a configuration of a cartridge according to a modification example of the embodiment of the present disclosure.

FIG. 23 is an exploded perspective view illustrating an example of a configuration of a 2-reel type cartridge 121. The cartridge 121 includes an upper half 102 made of a synthetic resin, a transparent window member 123 fitted and fixed to a window portion 102a opened on the upper surface of the upper half 102, a reel holder 122 that is fixed to the inside of the upper half 102 to prevent reels 106 and 107 from floating, a lower half 105 that corresponds to the upper half 102, the reels 106 and 107 that are accommodated in a space formed by combining the upper half 102 and the lower half 105, a magnetic tape MT1 that is wound around the reels 106 and 107, a front lid 109 that closes a front opening formed by combining the upper half 102 and the lower half 105, and a back lid 109A that protects the magnetic tape MT1 exposed on the front opening.

The reel 106 includes a lower flange 106b having a cylindrical hub portion 106a around which the magnetic tape MT1 is wound in the center thereof, an upper flange 106c having substantially the same size as the lower flange 106b, and a reel plate 111 sandwiched between the hub portion 106a and the upper flange 106c. The reel 107 has the same configuration as the reel 106.

The window member 123 is provided with attachment holes 123a for assembling the reel holder 122, which is a reel holding means for preventing the reels from floating, at positions corresponding to the reels 106 and 107. The magnetic tape MT1 is the same as the magnetic tape MT in a first embodiment.

Modification Example 2

In the above-described embodiment, in a case where a magnetic powder contains hexagonal ferrite particle powder, an average particle size of the magnetic powder may be, for example, 13 nm or more and 22 nm or less, 13 nm or more and 19 nm or less, 13 nm or more and 18 nm or less, 14 nm or more and 17 nm or less, or 14 nm or more and 16 nm or less.

In the above-described embodiment, in a case where a magnetic powder contains hexagonal ferrite particle powder, average aspect ratio of the magnetic powder may be, for example, 1.0 or more and 3.0 or less, 1.5 or more and 2.8, or less or 1.8 or more and 2.7 or less.

In the above-described embodiment, in a case where a magnetic powder contains hexagonal ferrite particle powder, an average particle volume of the magnetic powder may be, for example, 500 $nm^3$ or more and 2500 $nm^3$ or less, 500 $nm^3$ or more and 1600 $nm^3$ or less, 500 $nm^3$ or more and 1500 $nm^3$ or less, 600 $nm^3$ or more and 1200 $nm^3$ or less, or 600 $nm^3$ or more and 1000 $nm^3$ or less.

In the above-described embodiment, in a case where a magnetic powder contains ε-iron oxide particle powder, an average particle size of the magnetic powder may be, for example, 10 nm or more and 20 nm or less, 10 nm or more and 18 nm or less, 10 nm or more and 16 nm or less, 10 nm or more and 15 nm or less, or 10 nm or more and 14 nm or less.

In the above-described embodiment, in a case where a magnetic powder contains ε-iron oxide particle powder, an average aspect ratio of the magnetic powder may be, for example, 1.0 or more and 3.0 or less, 1.0 or more and 2.5 or less, 1.0 or more and 2.1 or less, or 1.0 or more and 1.8 or less.

In the above-described embodiment, in a case where a magnetic powder contains ε-iron oxide particle powder, an average particle volume of the magnetic powder may be, for example, 500 $nm^3$ or more and 4000 $nm^3$ or less, 500 $nm^3$ or more and 3000 $nm^3$ or less, 500 $nm^3$ or more and 2000 $nm^3$ or less, 600 $nm^3$ or more and 1600 $nm^3$ or less, or 600 $nm^3$ or more and 1300 $nm^3$ or less.

In the above-described embodiment, in a case where a magnetic powder contains cobalt ferrite particle powder, an average particle size of the magnetic powder may be, for example, 8 nm or more and 20 nm or less, 8 nm or more and 18 nm or less, 8 nm or more and 16 nm or less, 8 nm or more and 13 nm or less, or 8 nm or more and 10 nm or less.

In the above-described embodiment, in a case where a magnetic powder contains cobalt ferrite particle powder, an average aspect ratio of the magnetic powder may be, for example, 1.0 or more and 3.0 or less, 1.0 or more and 2.5 or less, 1.0 or more and 2.1 or less, or 1.0 or more and 1.8 or less.

In the above-described embodiment, in a case where a magnetic powder contains cobalt ferrite particle powder, an average particle volume of the magnetic powder may be, for example, 500 $nm^3$ or more and 8000 $nm^3$ or less, 500 $nm^3$ or more and 6000 $nm^3$ or less, 500 $nm^3$ or more and 4000 $nm^3$ or less, 600 $nm^3$ or more and 2000 $nm^3$ or less, or 600 $nm^3$ or more and 1000 $nm^3$ or less.

EXAMPLES

Hereinafter, the present disclosure will be described below in detail with reference to examples, but the present disclosure is not limited to these examples.

In the following examples and comparative examples, an average aspect ratio of a magnetic powder, an average particle volume of a magnetic powder, a height range ΔH, a gradient range ΔA, the amount of oozing of a lubricant, an average thickness of a magnetic tape, an average thickness of a magnetic layer, an average thickness of an underlayer, an average thickness of a back layer, a squareness ratio S1 of a magnetic layer in the vertical direction of a magnetic tape, and a squareness ratio S2 of a magnetic layer in the longitudinal direction of a magnetic tape are values obtained by the measurement method described in the above-described embodiment.

Further, in the following examples and comparative examples, a height range ΔH, a gradient range ΔA, and the amount of oozing of a lubricant are values measured by a magnetic tape (a magnetic tape having been subjected to a calendering process) and obtained finally.

Example 1

(Preparation Process of Magnetic Layer Forming Coating Material)

A magnetic layer forming coating material is prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.

(First Composition)

Barium ferrite ($BaFe_{12}O_{19}$) magnetic powder (hexagonal plate shape, average aspect ratio of 3.2, average particle volume of 2500 $mm^3$): 100 parts by mass Vinyl chloride resin (cyclohexanone solution of 30% by mass): 65 parts by mass (containing a solution)

(Polymerization degree 300, Mn=10000, containing $OSO_3K$=0.07 mmol/g, secondary OH=0.3 mmol/g as a polar group)

Aluminum oxide powder having a medium particle size: 7.5 parts by mass ($\alpha$-$Al_2O_3$, average particle size (D50) of 0.09 μm)

(Second Composition)

Vinyl chloride resin: 1.1 parts by mass (Resin solution: resin content of 30% by mass, cyclohexanone of 70% by mass)

n-butyl stearate: 2 parts by mass

Methyl ethyl ketone: 121.3 parts by mass

Toluene: 121.3 parts by mass

Cyclohexanone: 60.7 parts by mass

Carbon black: 2 parts by mass (Made by Tokai Carbon Co., Ltd., trade name: Seast TA)

Finally, polyisocyanate of 4 parts by mass (trade name: coronate L manufactured by Tosoh Corporation) as a curing agent and stearic acid of 2 parts by mass as a lubricant were added to the magnetic layer forming coating material prepared as described above.

(Preparation Process of Underlayer Forming Coating Material)

An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.

(Third Composition)

Needle-like iron oxide powder (non-magnetic powder) having a medium particle size: 100 parts by mass ($\alpha$-$Fe_2O_3$, average major axis length of 0.08 μm)

Vinyl chloride resin: 55.6 parts by mass (Resin solution: resin content 30% by mass, cyclohexanone 70% by mass)

Carbon black: 10 parts by mass (average particle size of 20 nm)

(Fourth Composition)

Polyurethane resin UR8200 (manufactured by Toyo Boseki Kabushiki Kaisha): 18.5 parts by mass n-butyl stearate: 2 parts by mass Methyl ethyl ketone: 108.2 parts by mass Toluene: 108.2 parts by mass Cyclohexanone: 18.5 parts by mass Finally, polyisocyanate of 4 parts by mass (trade name: coronate L manufactured by Tosoh Corporation) as a curing agent and stearic acid of 2 parts by mass as a lubricant were added to the underlayer forming coating material prepared as described above.

(Preparation Process of Back Layer Forming Coating Material)

A back layer forming coating material was prepared as follows. The following raw materials were mixed in a stirring tank equipped with a disperser and filtered to prepare a back layer forming coating material.

Carbon black powder (average particle size (D50) 20 nm): 100 parts by mass Polyester polyurethane: 100 parts by mass (Made by Nippon Polyurethane Industry Co., Ltd., trade name: N-2304)

Methyl ethyl ketone: 500 parts by mass

Toluene: 400 parts by mass

Cyclohexanone: 100 parts by mass (Coating Process)

An underlayer and a magnetic layer were formed on one main surface of a long polyethylene naphthalate film (hereinafter, referred to as a "PEN film") having an average thickness of 3.6 μm, which is a non-magnetic support, as follows by using the magnetic layer forming coating material and the underlayer forming coating material which were prepared as described above. First, an underlayer forming coating material was applied on one main surface of the PEN film and dried to form an underlayer so that an average thickness thereof was set to 1.1 μm after calendering. Next, a magnetic layer forming coating material was applied on the underlayer and dried to form a magnetic layer so that an average thickness thereof was set to 85 nm after calendering. Note that, when the magnetic layer forming coating material was dried, the magnetic powder was magnetically oriented in the thickness direction of the film by a solenoid coil. In addition, a squareness ratio S1 in the vertical direction (thickness direction) of the magnetic tape was set to 65%, and a squareness ratio S2 in the longitudinal direction of the magnetic tape was set to 38%. Subsequently, a back layer forming coating material was applied on the other main surface of the PEN film and dried to form a back layer so that an average thickness thereof was set to 0.4 μm after calendering. Thereby, a magnetic tape was obtained.

(Calendering Process)

Calendering was performed to smooth the surface of the magnetic layer. At this time, the temperature of the calendering was set to a reference temperature of 100° C., and the pressure of the calendering was set to a reference pressure of 200 kg/cm, so that a gradient range ΔA was set to 3.15 degrees, a height range ΔH was set to 8.80 nm, and the amount of oozing of a lubricant was set to 3.5 $\mu m^2$.

(Cutting Process)

The magnetic tape obtained as described above was cut to a width of ½ inches (12.65 mm). Thereby, the magnetic tape having an average thickness of 5.2 μm was obtained.

Example 2

In the preparation process of the underlayer forming coating material, needle-like iron oxide powder having a large particle size (α-Fe$_2$O$_3$, average major axis length of 0.12 μm) was used instead of needle-like iron oxide powder having a medium particle size (α-Fe$_2$O$_3$, average major axis length of 0.08 μm) to obtain a magnetic tape in the same manner as in Example 1 except that a gradient range ΔA was set to 4.50 degrees, and a height range ΔH was set to 9.50 nm.

Example 3

In the calendering process, the pressure of the calendering was changed to a pressure lower than the reference pressure of 200 kg/cm in Example 1 to obtain a magnetic tape in the same manner as in Example 1 except that a gradient range ΔA was set to 3.40 degrees, a height range ΔH was set to 9.00 nm, and the amount of oozing of a lubricant was set to 6.5 μm$^2$.

Example 4

In the calendering process, the pressure of the calendering was set to a pressure lower than that in Example 3 to obtain a magnetic tape in the same manner as in Example 3 except that a gradient range ΔA was set to 4.00 degrees, a height range ΔH was set to 9.30 nm, and the amount of oozing of a lubricant was set to 7.0 μm$^2$.

Example 5

In the calendering process, the pressure of the calendering was changed to a pressure higher than the reference pressure of 200 kg/cm in Example 1 to obtain a magnetic tape in the same manner as in Example 1 except that a gradient range ΔA was set to 2.80 degrees, a height range ΔH was set to 8.70 nm, and the amount of oozing of a lubricant was set to 3.2 μm$^2$.

Comparative Example 1

In the calendering process, the temperature of the calendering was set to a pressure lower than the reference temperature of 100° C. in Example 1 to obtain a magnetic tape in the same manner as in Example 2 except that a gradient range ΔA was set to 5.20 degrees, a height range ΔH was set to 8.50 nm, and the amount of oozing of a lubricant was set to 3.6 μm$^2$.

Example 6

In the preparation process of the magnetic layer forming coating material, barium ferrite magnetic powder (hexagonal plate shape, average aspect ratio of 2.8, average particle volume of 1600 nm$^3$) was used instead of barium ferrite magnetic powder (hexagonal plate shape, average aspect ratio of 3.2, average particle volume of 2500 mm$^3$). Further, in the preparation process of the magnetic layer forming coating material, the amount of medium particle-sized aluminum oxide powder added was changed to 3.0 parts by mass. Thereby, a gradient range ΔA was set to 3.08 degrees, and a height range ΔH was set to 7.46 nm. A magnetic tape was obtained in the same manner as in Example 1 except for the above.

Example 7

In the calendering process, the temperature of the calendering was changed to a temperature lower than the reference temperature of 100° C. in Example 1 (specifically, a temperature between the calendering temperature in Example 1 and the calendering temperature in Comparative Example 1) to obtain a magnetic tape in the same manner as in Example 6 except that a gradient range ΔA was set to 3.52 degrees, a height range ΔH was set to 8.42 nm, and the amount of oozing of a lubricant was set to 3.6 μm$^2$.

Example 8

In the preparation process of the underlayer forming coating material, needle-like iron oxide powder having a large particle size (α-Fe$_2$O$_3$, average major axis length of 0.12 μm) was used instead of needle-like iron oxide powder having a medium particle size (α-Fe$_2$O$_3$, average major axis length of 0.08 μm) to obtain a magnetic tape in the same manner as in Example 6 except that a gradient range ΔA was set to 4.80 degrees, and a height range ΔH was set to 6.50 nm.

Example 9

In the calendering process, the pressure of the calendering was changed to a pressure lower than the reference pressure of 200 kg/cm in Example 1 to obtain a magnetic tape in the same manner as in Example 6 except that a gradient range ΔA was set to 3.70 degrees, a height range ΔH was set to 7.10 nm, and the amount of oozing of a lubricant was set to 6.4 μm$^2$.

Example 10

In the calendering process, the pressure of the calendering was set to a pressure lower than that in Example 9 to obtain a magnetic tape in the same manner as in Example 9 except that a gradient range ΔA was set to 4.13 degrees, a height range ΔH was set to 7.62 nm, and the amount of oozing of a lubricant was set to 6.8 μm$^2$.

Example 11

In the calendering process, the pressure of the calendering was changed to a pressure higher than the reference pressure of 200 kg/cm in Example 1 to obtain a magnetic tape in the same manner as in Example 6 except that a gradient range ΔA was set to 3.10 degrees, a height range ΔH was set to 6.90 nm, and the amount of oozing of a lubricant was set to 3.0 μm$^2$.

Comparative Example 2

In the calendering process, the temperature of the calendering was set to a pressure higher than the reference temperature of 100° C. in Example 1 to obtain a magnetic tape in the same manner as in Example 6 except that a gradient range ΔA was set to 2.40 degrees, a height range ΔH was set to 6.50 nm, and the amount of oozing of a lubricant was set to 3.3 μm$^2$.

Example 12

In the preparation process of the magnetic layer forming coating material, aluminum oxide powder (α-Al$_2$O$_3$, average particle size (D50) of 0.05 μm) having a small particle size was used instead of aluminum oxide powder (α-Al$_2$O$_3$, average particle size (D50) of 0.09 μm) having a medium particle size to obtain a magnetic tape in the same manner as in Example 6 except that a gradient range ΔA was set to 2.80 degrees, and a height range ΔH was set to 5.00 nm.

Example 13

In the preparation process of the underlayer forming coating material, needle-like iron oxide powder having a large particle size (α-Fe$_2$O$_3$, average major axis length of 0.12 µm) was used instead of needle-like iron oxide powder having a medium particle size (α-Fe$_2$O$_3$, average major axis length of 0.08 µm) to obtain a magnetic tape in the same manner as in Example 12 except that a gradient range ΔA was set to 4.38 degrees, and a height range ΔH was set to 5.07 nm.

Comparative Example 3

In the preparation process of the magnetic layer forming coating material, the amount of small particle-sized aluminum oxide powder added was changed to 1.0 parts by mass. Further, in the calendering process, the temperature of the calendering was changed to a temperature lower than the reference temperature of 100° C. in Example 1 (specifically, a temperature between the calendering temperature in Example 1 and the calendering temperature in Comparative Example 1). Thereby, a gradient range ΔA was set to 3.80 degrees, a height range ΔH was set to 3.60 nm, and the amount of oozing of a lubricant was set to 3.6 µm$^2$. A magnetic tape was obtained in the same manner as in Example 12 except for the above.

Comparative Example 4

In the preparation process of the magnetic layer forming coating material, barium ferrite magnetic powder (hexagonal plate shape, average aspect ratio of 3.2, average particle volume of 3500 nm$^3$) was used instead of barium ferrite magnetic powder (hexagonal plate shape, average aspect ratio of 3.2, average particle volume of 2500 mm$^3$). Further, in the preparation process of the magnetic layer forming coating material, the amount of aluminum oxide powder added was changed to 10.0 parts by mass. Thereby, a gradient range ΔA was set to 3.26 degrees, and a height range ΔH was set to 11.20 nm. A magnetic tape was obtained in the same manner as in Example 1 except for the above.

Comparative Example 5

In the calendering process, the temperature of the calendering was changed to a temperature lower than the reference temperature of 100° C. in Example 1 (specifically, a temperature between the calendering temperature in Example 1 and the calendering temperature in Comparative Example 1) to obtain a magnetic tape in the same manner as in Comparative Example 4 except that a gradient range ΔA was set to 4.07 degrees, a height range ΔH was set to 10.20 nm, and the amount of oozing of a lubricant was set to 3.6 µm$^2$.

EVALUATION (SNR)

SNR of a magnetic tape on which a servo pattern was written was evaluated as follows. SNR (electromagnetic conversion characteristics) of the magnetic tape in a 25° C. environment was measured using a ½ inch tape running device (MTS Transport manufactured by Mountain Engineering II) equipped with a recording/reproducing head and a recording/reproducing amplifier. A ring head with a gap length of 0.2 µm was used for the recording head, and a GMR head with a distance of 0.1 µm between shields was used for the reproducing head. A relative speed was set to 6 m/s, a recording clock frequency was set to 160 MHz, and a recording track width was set to 2.0 µm. In addition, SNR was calculated based on the method described in the following literature. The results were shown in Table 1 as relative values with SNR in Comparative Example 4 as 0 dB. Y. Okazaki: "An Error Rate Emulation System.", IEEE Trans. Man., 31, pp. 3093-3095 (1995)

(Friction Coefficient Ratio, Relative Friction)

First, after the magnetic tape obtained as described above was demagnetized, five servo bands were formed by writing a servo pattern on the magnetic tape using a servo writer. The servo pattern was made to comply with the LTO-8 standard.

Next, a friction coefficient ratio ($\mu_B/\mu_A$) of the magnetic tape was evaluated by the evaluation method described in the above-described embodiment. In addition, a ratio of dynamic friction coefficients $\mu_A$ in Examples 1 to 13 and Comparative Examples 2 to 5 with respect to a dynamic friction coefficient $\mu_A$ in Comparative Example 1 was obtained using a dynamic friction coefficient (a dynamic friction coefficient before full-scale recording/full-scale reproduction is performed) $\mu_A$ measured during the evaluation of a friction coefficient ratio, and the ratio was set to be a relative friction. A specific calculation formula for a relative friction is as follows.

Relative friction=(Dynamic friction coefficients $\mu_A$ in Examples 1 to 13 and Comparative Examples 2 to 5)/(Dynamic friction coefficient $\mu_A$ in Comparative Example 1)

Table 1 shows configurations and evaluation results of magnetic tapes in Examples 1 to 13 and Comparative Examples 1 to 5.

TABLE 1

| | Magnetic layer | | | Underlayer Non-magnetic | | | | AFM surface profile | | Lubricant Amount of | Evaluation result | | |
|---|---|---|---|---|---|---|---|---|---|---|---|---|---|
| | Magnetic powder Average particle volume [nm$^3$] | Amount of addition [parts by mass] | Additive Average particle size [µm] | powder Average major axis length [µm] | Process Calender Temperature | Pressure | ΔA [degree] | ΔH [nm] | oozing [µm$^2$] | SNR[dB] | Relative friction | Friction coefficient ratio ($\mu_B/\mu_A$) |
| Comparative example 4 | 3500 | 10.0 | 0.09 | 0.08 | Reference temperature | Reference pressure | 3.26 | 11.20 | 3.5 | 0.0 | 1.00 | 1.2 |
| Comparative example 5 | 3500 | 10.0 | 0.09 | 0.08 | Low temperature | Reference pressure | 4.07 | 10.20 | 3.6 | −0.2 | 0.98 | 1.2 |
| Example 1 | 2500 | 7.5 | 0.09 | 0.08 | Reference temperature | Reference pressure | 3.15 | 8.80 | 3.5 | 0.5 | 1.00 | 1.2 |
| Example 2 | 2500 | 7.5 | 0.09 | 0.12 | Reference temperature | Reference pressure | 4.50 | 9.50 | 3.5 | 0.2 | 0.96 | 1.2 |

TABLE 1-continued

| | Magnetic layer | | | Underlayer Non-magnetic | Process | | AFM surface profile | | Lubricant Amount of | Evaluation result | | Friction co-efficient |
| | Magnetic powder Average particle volume [nm³] | Additive Amount of addition [parts by mass] | Additive Average particle size [μm] | powder Average major axis length [μm] | Calender Temperature | Pressure | ΔA [degree] | ΔH [nm] | oozing [μm²] | SNR[dB] | Relative friction | ratio ($\mu_B/\mu_A$) |
|---|---|---|---|---|---|---|---|---|---|---|---|---|
| Example 3 | 2500 | 7.5 | 0.09 | 0.08 | Reference temperature | Low pressure | 3.40 | 9.00 | 6.5 | 0.5 | 0.99 | 1.5 |
| Example 4 | 2500 | 7.5 | 0.09 | 0.08 | Reference temperature | Low pressure | 4.00 | 9.30 | 7.0 | 0.2 | 0.99 | 2.0 |
| Example 5 | 2500 | 7.5 | 0.09 | 0.08 | Reference temperature | High pressure | 2.80 | 8.70 | 3.2 | 0.5 | 1.00 | 1.2 |
| Comparative example 1 | 2500 | 7.5 | 0.09 | 0.12 | Low temperature | Reference pressure | 5.20 | 8.50 | 3.6 | Difficulty in measurement due to powder falling-off | 0.96 | 1.2 |
| Example 6 | 1600 | 3.0 | 0.09 | 0.08 | Reference temperature | Reference pressure | 3.08 | 7.46 | 3.5 | 1.6 | 1.00 | 1.2 |
| Example 7 | 1600 | 3.0 | 0.09 | 0.08 | Low temperature | Reference pressure | 3.52 | 8.42 | 3.6 | 1.3 | 1.00 | 1.2 |
| Example 8 | 1600 | 3.0 | 0.09 | 0.12 | Reference temperature | Reference pressure | 4.80 | 6.50 | 3.5 | 1.2 | 0.96 | 1.2 |
| Example 9 | 1600 | 3.0 | 0.09 | 0.08 | Reference temperature | Low pressure | 3.70 | 7.10 | 6.4 | 1.5 | 0.99 | 1.4 |
| Example 10 | 1600 | 3.0 | 0.09 | 0.08 | Reference temperature | Low pressure | 4.13 | 7.62 | 6.8 | 1.0 | 0.99 | 2.0 |
| Example 11 | 1600 | 3.0 | 0.09 | 0.08 | Reference temperature | High pressure | 3.10 | 6.90 | 3.0 | 1.5 | 0.99 | 1.2 |
| Comparative example 2 | 1600 | 3.0 | 0.09 | 0.08 | High temperature | Reference pressure | 2.40 | 6.50 | 3.3 | 1.7 | 1.05 | 1.2 |
| Example 12 | 1600 | 3.0 | 0.05 | 0.08 | Reference temperature | Reference pressure | 2.80 | 5.00 | 3.5 | 2.4 | 1.00 | 1.2 |
| Example 13 | 1600 | 3.0 | 0.05 | 0.12 | Reference temperature | Reference pressure | 4.38 | 5.07 | 3.5 | 2.0 | 0.98 | 1.2 |
| Comparative example 3 | 1600 | 1.0 | 0.05 | 0.08 | Low temperature | Reference pressure | 3.80 | 3.60 | 3.6 | Immeasurable due to sticking | 1.02 | 1.2 |

Specific material names of additives and non-magnetic powders shown in Table 1 are as follows.

Additive: aluminum oxide powder ($\alpha$-$Al_2O_3$)
Non-magnetic powder: needle-like iron oxide powder ($\alpha$-$Fe_2O_3$)
Reference temperature: 100° C.
Reference pressure: 200 kg/cm FIG. 24 is a graph showing a relationship between height ranges ΔH and gradient ranges ΔA of the magnetic tapes in Examples 1 to 13 and Comparative Examples 1 to 5.

Figure 24:
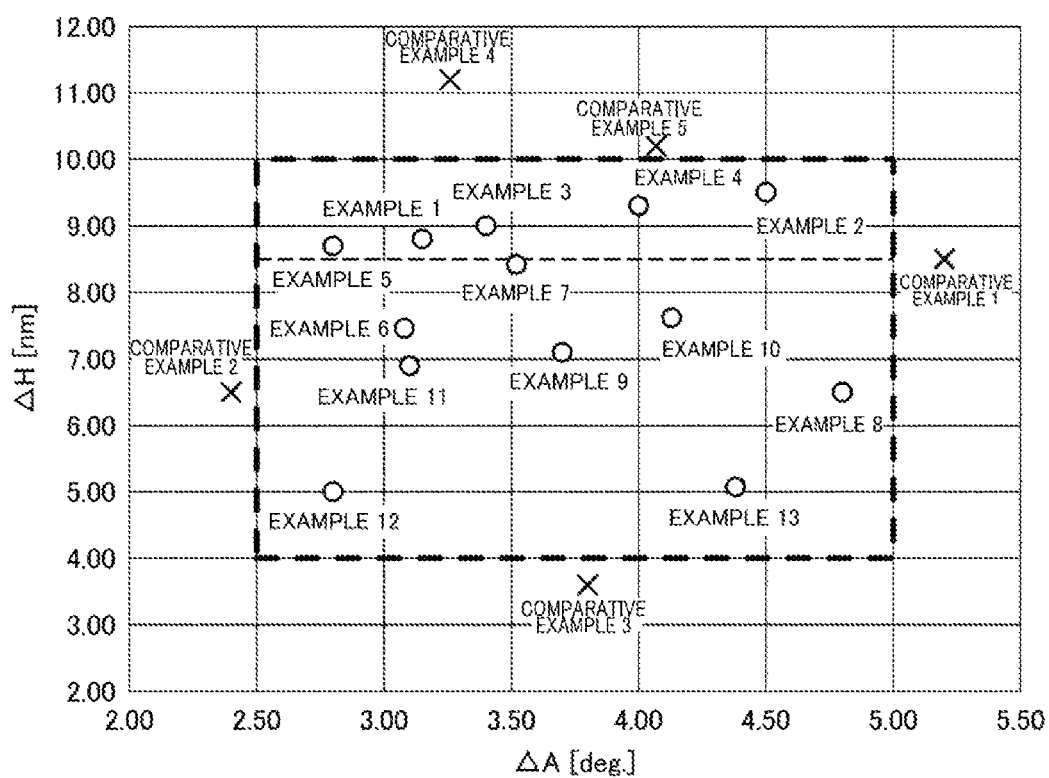
FIG. 24 is a graph illustrating a relationship between a height range $\Delta H$ and a gradient range $\Delta A$.

The following can be seen from Table 1 and FIG. 24. When the height range ΔH is in a range of ΔH<4.00 nm, a magnetic head sticks to a magnetic tape, and thus it becomes difficult for the magnetic tape to run. On the other hand, when the height range ΔH is in a range of 10.00 nm<ΔH, SNR (electromagnetic conversion characteristics) deteriorates due to a spacing loss.

When the gradient range ΔA is in a range of ΔA<2.50 degrees, a relative friction increases, and thus running stability of the magnetic tape deteriorates. On the other hand, when the gradient range ΔA is in a range of 5.00 degrees <ΔA, the gradient of a protrusion on the surface of a magnetic layer becomes excessively steep, and the protrusion is scraped when the magnetic tape is running, so that powder falls off. When the height range ΔH is in a range of 4.00≤ΔH≤8.50 nm, SNR (electromagnetic conversion characteristics) can be further improved.

Thus, the height range ΔH is set to be in a range of 4.00 nm≤ΔH≤10.00 nm, and the gradient range ΔA is set to be in a range of 2.50 degrees ≤ΔA, so that both excellent recording/reproducing characteristics (electromagnetic conversion characteristics) and excellent running stability (low friction) can be achieved. In addition, the height range ΔH is set to be in a range of 4.00 nm≤ΔH≤10.00 nm, and the gradient range ΔA is set to be in a range of 2.50 degrees≤ΔA≤5.00 degrees, so that it is possible to achieve both excellent recording/reproducing characteristics (electromagnetic conversion characteristics) and excellent running stability (low friction) and to prevent powder from falling off from the surface of the magnetic layer during running.

While embodiments and modification examples of the present disclosure have been described above in detail, the present disclosure is not limited to the above embodiments and modification examples, and various modifications based on the technical idea of the present disclosure can be made. For example, the configurations, methods, processes, shapes, materials, numerical values and the like exemplified in the above embodiments and modification examples are only examples, and as necessary, different configurations, methods, processes, shapes, materials, numerical values and the like may be used. The configurations, methods, processes, shapes, materials, numerical values and the like of the above embodiments and modification examples can be combined with each other as long as they do not deviate from the gist of the present disclosure.

The chemical formulas of the compounds and the like exemplified in the above embodiments and modification examples are representative, and a general name of the same compound is not limited to the listed valences and the like. In the numerical ranges stated in stages in the above embodiments and modification examples, the upper limit value or the lower limit value of the numerical range of a certain stage may be replaced with the upper limit value or the lower limit value in the numerical range of another stage. Unless otherwise specified, the materials exemplified in the above embodiments and modification examples may be used alone or two or more thereof may be used in combination.

In addition, the present disclosure can also adopt the following configurations.

(1) A magnetic recording medium with a tape shape including:
a substrate;
an underlayer provided on the substrate; and
a magnetic layer provided on the underlayer,
wherein the magnetic layer has a surface having an uneven shape,
a height range ΔH obtained from statistical information of a height of the uneven shape is in a range of 4.00 nm≤ΔH≤10.00 nm, and
a gradient range ΔA obtained from statistical information of a gradient of the uneven shape is in a range of 2.50 degrees ≤ΔA.

(2) The magnetic recording medium according to (1), wherein the gradient range ΔA is in a range of 2.50 degrees ≤ΔA≤5.00 degrees.

(3) The magnetic recording medium according to (1) or (2),
wherein the height range ΔH is in a range of 4.00 nm≤ΔH≤8.50 nm.

(4) The magnetic recording medium according to any one of (1) to (3),
wherein the underlayer and the magnetic layer contain a lubricant, and
the amount S of oozing of the lubricant per unit area of 12.5 μm×9.3 μm on the surface of the magnetic layer in vacuum is in a range of 3.0 μm²≤S≤6.5 μm².

(5) The magnetic recording medium according to (4), wherein the lubricant contains fatty acids and fatty acid esters.

(6) The magnetic recording medium according to any one of (1) to (5),
wherein a friction coefficient ratio ($\mu_B/\mu_A$) between a dynamic friction coefficient $\mu_B$ obtained after full-scale recording/full-scale reproduction is performed twice and a dynamic friction coefficient $\mu_A$ before the full-scale recording/full-scale reproduction is performed is less than 2.0.

(7) The magnetic recording medium according to any one of (1) to (6), wherein a squareness ratio of the magnetic layer in a vertical direction of the magnetic recording medium is 65% or more.

(8) The magnetic recording medium according to any one of (1) to (7),
wherein an average thickness of the magnetic recording medium is 5.3 μm or less.

(9) The magnetic recording medium according to any one of (1) to (8),
wherein an average thickness of the magnetic layer is 80 nm or less.

(10) The magnetic recording medium according to any one of (1) to (9),
wherein an average thickness of the substrate is 4.4 μm or less.

(11) The magnetic recording medium according to any one of (1) to (10),
wherein the magnetic layer contains a magnetic powder, and
the average particle volume of the magnetic powder is 2500 nm³ or less.

(12) The magnetic recording medium according to (11), wherein the average particle volume of the magnetic powder is 1600 nm³ or less.

(13) The magnetic recording medium according to any one of (1) to (10),
wherein the magnetic layer contains a magnetic powder, and
the magnetic powder contains hexagonal ferrite, ε-iron oxide, or Co-containing spinel ferrite.

(14) The magnetic recording medium according to any one of (1) to (13),
wherein the magnetic layer includes five or more servo bands.

(15) The magnetic recording medium according to (14), wherein the magnetic layer includes nine or more servo bands.

(16) The magnetic recording medium according to (14), wherein a ratio of a total area of the five or more servo bands with respect to an area of the surface of the magnetic layer is 4.0% or less.

(17) The magnetic recording medium according to any one of (14) to (16),
wherein a width of the servo band is 95 μm or less.

(18) The magnetic recording medium according to any one of (1) to (17),
wherein the magnetic layer is configured to be able to form a plurality of data tracks, and
a width of the data track is 2000 nm or less.

(19) The magnetic recording medium according to any one of (1) to (18),
wherein the substrate contains polyester.

(20) A cartridge comprising the magnetic recording medium according to any one of (1) to (19).

REFERENCE SIGNS LIST

10 Cartridge
11 Cartridge memory
31 Antenna coil
32 Rectification and power circuit
33 Clock circuit
34 Detection and modulation circuit
35 Controller
36 Memory
36A First storage region
36B Second storage region
41 Substrate
42 Underlayer
43 Magnetic layer
44 Back layer
110 Servo frame
111 Servo subframe 1
111A A burst
111B B burst
112 Servo subframe 2
112C C burst
112C C burst
113 Servo stripe
MT Magnetic tape
SB Servo band
DB Data bind

The invention claimed is:
1. A magnetic recording medium with a tape shape comprising:
a substrate;
an underlayer provided on the substrate; and
a magnetic layer provided on the underlayer,
wherein the magnetic layer has a surface having an uneven shape,
a height range ΔH obtained from statistical information of a height of the uneven shape is in a range of 4.00 nm≤ΔH≤10.00 nm, and a gradient range ΔA obtained from statistical information of a gradient of the uneven shape is in a range of 2.50 degrees ≤ΔA.

2. The magnetic recording medium according to claim 1, wherein the gradient range ΔA is in a range of 2.50 degrees ≤ΔA≤5.00 degrees.

3. The magnetic recording medium according to claim 1, wherein the height range ΔA is in a range of 4.00 nm≤ΔA≤8.50 nm.

4. The magnetic recording medium according to claim 1, wherein the underlayer and the magnetic layer contain a lubricant, and
the amount S of oozing of the lubricant per unit area of 12.5 μm×9.3 μm on the surface of the magnetic layer in vacuum is in a range of 3.0 μm²≤S≤6.5 μm².

5. The magnetic recording medium according to claim 4, wherein the lubricant contains fatty acids and fatty acid esters.

6. The magnetic recording medium according to claim 1, wherein a friction coefficient ratio ($\mu_B/\mu_A$) between a dynamic friction coefficient $\mu_B$ obtained after full-scale recording/full-scale reproduction is performed twice and a dynamic friction coefficient $\mu_A$ before the full-scale recording/full-scale reproduction is performed is less than 2.0.

7. The magnetic recording medium according to claim 1, wherein a squareness ratio of the magnetic layer in a vertical direction of the magnetic recording medium is 65% or more.

8. The magnetic recording medium according to claim 1, wherein an average thickness of the magnetic recording medium is 5.3 μm or less.

9. The magnetic recording medium according to claim 1, wherein an average thickness of the magnetic layer is 80 nm or less.

10. The magnetic recording medium according to claim 1, wherein an average thickness of the substrate is 4.4 μm or less.

11. The magnetic recording medium according to claim 1, wherein the magnetic layer contains a magnetic powder, and
the average particle volume of the magnetic powder is 2500 nm³ or less.

12. The magnetic recording medium according to claim 11, wherein the average particle volume of the magnetic powder is 1600 nm³ or less.

13. The magnetic recording medium according to claim 1, wherein the magnetic layer contains a magnetic powder, and
the magnetic powder contains hexagonal ferrite, ε-iron oxide, or Co-containing spinel ferrite.

14. The magnetic recording medium according to claim 1, wherein the magnetic layer includes five or more servo bands.

15. The magnetic recording medium according to claim 14, wherein the magnetic layer includes nine or more servo bands.

16. The magnetic recording medium according to claim 14, wherein a ratio of a total area of the five or more servo bands with respect to an area of the surface of the magnetic layer is 4.0% or less.

17. The magnetic recording medium according to claim 14, wherein a width of the servo band is 95 μm or less.

18. The magnetic recording medium according to claim 1, wherein the magnetic layer is configured to be able to form a plurality of data tracks, and
a width of the data track is 2000 nm or less.

19. The magnetic recording medium according to claim 1, wherein the substrate contains polyester.

20. A cartridge comprising the magnetic recording medium according to claim 1.

* * * * *